United States Patent [19]

Miller et al.

[11] 4,196,450

[45] Apr. 1, 1980

[54] SELECTIVE COPYING APPARATUS

[75] Inventors: Armin Miller; Maxwell G. Maginness, both of Palo Alto, Calif.

[73] Assignee: Datacopy Corporation, Palo Alto, Calif.

[21] Appl. No.: 924,645

[22] Filed: Jul. 14, 1978

Related U.S. Application Data

[63] Continuation-in-part of Ser. No. 760,427, Jan. 18, 1977, abandoned.

[51] Int. Cl.² .............................................. H04N 1/40
[52] U.S. Cl. .................................... 358/256; 358/903; 358/280; 364/523
[58] Field of Search .................. 358/256, 903, 280; 364/523

[56] References Cited

U.S. PATENT DOCUMENTS

| | | | |
|---|---|---|---|
| 3,346,692 | 10/1967 | Garfield | 358/256 |
| 3,828,319 | 8/1974 | Owen | 358/256 |
| 3,913,719 | 10/1975 | Frey | 197/1 R |

*Primary Examiner*—Howard W. Britton
*Attorney, Agent, or Firm*—Owen L. Lamb

[57] ABSTRACT

Selective copying apparatus wherein selected portions of a source document are copied onto a copy paper at any position on the copy paper and wherein information is deleted or inserted by the user from an input keyboard. A manually-operated portable scanner is used by the operator to scan a selected portion of the document by placing the scanner at the desired line position and moving the scanner across the document. The scanned image is converted into digital data. A copier responds to the digital data and copies the scanned image onto a copy paper at a line position which is also selected by the operator. Thus, the image selected by the operator on the source document is reproduced at a position on the copy paper which is also separately selected by the operator.

18 Claims, 8 Drawing Figures

CAMERA

KEYBOARD AND CONTROL MODULE

SELECTIVE COPYING APPARATUS

RELATED APPLICATIONS

The present application is a continuation-in-part of copending application Ser. No. 760,427, filed Jan. 18, 1977, by Armin Miller and Maxwell G. Maginness, entitled "Selective Copying Apparatus," and now abandoned.

BACKGROUND OF THE INVENTION

1. Field of the Invention

The invention relates to selective copying apparatus and more particularly to apparatus for manually scanning images, storing the images, and reproducing said images at selected positions of a recording device.

2. Description of the Prior Art

Selective copying and editing of printed material is one of the most universally performed functions of individuals who deal with information in books, documents, labels, forms, catalogs, printouts, and drawings. The useful content of the source material is but a small fraction of the total material available. For example, only a paragraph, footnote, single-line equation, or drawing may be all that is needed to be excerpted. At present, most selective copying is done either by hand or by copying a full page in a conventional copier and then cutting out the material required. This "cut-and-paste" operation is time consuming.

Prior attempts have been made to provide portable selective copying apparatus so that it is not necessary to carry source material to a copy machine. In the prior apparatus, a hand-held reading probe is swept across the source material and the portion scanned is transferred to a visible hard-copy printout. An example of such a device is shown in U.S. Pat. No. 3,052,755 which issued to E. Garfield on Sept. 4, 1962. In this patent, a scanning instrument is hand-held and swept over the printed matter to be copied. A light source within the scanner reflects off the printed page. A light-conducting rod picks up the reflecting light and transmits it to a photoelectric cell. The voltage from the photoelectric cell is then transmitted over a cable to a printer. The printer is comprised to a stylus which rides on a strip of electrosensitive paper so that when a voltage is applied to the stylus a mark is made on the paper strip. Thus a printed mark on the page being copied produces a corresponding mark on the paper strip. The amplitude of the sweep of the light source inside the scanner is adjustable for various sized printed letters.

A subsequent U.S. Pat. No. 3,064,078 which issued on Nov. 13, 1962 to E. Garfield discloses a similar apparatus with a different reproducing print head. The reproducing instrument has a mirror which focuses a light beam on the print medium. Light-sensitive paper is used so that printing occurs in response to the light beam. The amplitude of the sweep of the reproducing mirror is adjustable to correspond to the amplitude of the sweep of the light source within the selective scanner.

A parallel version of the above patent is described in U.S. Pat. No. 3,318,996 which issued to E. Garfield et al on May 9, 1967. This patent uses light-conducting fiber rods arranged in a vertical column over the printed matter. The transmitting ends of the rods are placed adjacent to photocells, one photocell for each rod. The parallel outputs of the photocells are transmitted to the printer which has a like number of stylii in parallel across a paper strip. Electrostatic paper is used for printing information on the strip corresponding to that scanned by the rods. Synchronization of the paper strip which is moved past the print elements is accomplished by a roller on the scanner which rotates as the scanner is swept across the page. Futhermore, a mask is provided to mask out the number of rods to thus adjust the amount of the document scanned to accommodate different height printed characters.

In all of the above patents, printing is accomplished on a paper strip which is able to print only one continuous line of matter which is scanned. It is still necessary for a user to cut and paste in oder to edit the scanned material, even though the material is selectively scanned. Thus, if the user wants to arrange the scanned information at different places on a printed document, it must first be cut from the paper strip and arranged on the printed page. While these patents provide means for selectively copying, they do not provide means for selectively reproducing the copied material anywhere on a printed page.

A limited form of editing is provided in U.S. Pat. No. 3,512,129 which issued to E. Garfield on May 12, 1970. In this apparatus, character recognition is provided which is connected to the scanning device. A scanned character is recognized as a particular letter and is converted to machine-readable form, that is, to a standard computer code such as ASCII. A typewriter is connected to receive this code and to type out the information in printed form. This apparatus will only prepare a typewritten document and will only reproduce selected portions of typewritten documents of a type font which can be recognized by the character recognition circuits. For example, in order for the character recognition circuits to read a type font which is different from that produced by the typewriter itself, it is necessary to have character recognition circuits for each such type font to be recognized. With the large number of type fonts in use today, it is readily seen that an enormously complex character recognition unit is necessary in order to render this apparatus useful in a practical sense.

SUMMARY OF THE INVENTION

It is a primary object of this invention to provide a selective copying system wherein selected portions of a source document may be copied by a user onto any selected position of a copy paper and wherein new material may be added by the user from an inputer source.

It is also an object of this invention to provide a selective copier wherein any font desired by the user can be entered into the control circuits so that a type font which is compatible with the type font of the material being selectively copied can be inserted by the operator onto the output copy.

It is also an object of this invention to provide a selective copying apparatus having editing and format control wherein the sequence, the position on the page, fields to be scanned, the position of the reproduced image on the copy paper, and information entered by means of a keyboard are all under control of the operator.

The above objects are accomplished in accordance with the invention by providing a manually-operated portable scanner which is adapted to scan a selected portion of a source document by placing the scanner at a selected line position on the source document and moving the scanner across the material to be reproduced. The scanned image is converted into digital data. A reproducing element responsive to digital data is provided for copying the scanned image onto a recording device such as a copy paper or a video display screen. Controls are provided for selectively positioning the reproducing element at any vertical or horizontal point on the recording device to thus provide full flexibility in editing.

In accordance with an aspect of the invention, a keyboard input is provided which selects type fonts under control of the operator. The type fonts are read from a storage device and are in a digital form which is compatible with the reproducing element.

The invention has the advantage that the sequence and position of the information copied on the displayed or printed page is fully controllable by the operator. Furthermore, information can be entered by a keyboard and reproduced at any position on the display screen or copy paper and in a type font which is easily changed to be compatible with the type font of the information in the source document.

The foregoing and other objects, features and advantages of the invention will be apparent from the following more particular description of preferred embodiments of the invention as illustrated in the accompanying drawings.

DESCRIPTION OF FIRST EMBODIMENT

Figure 1:
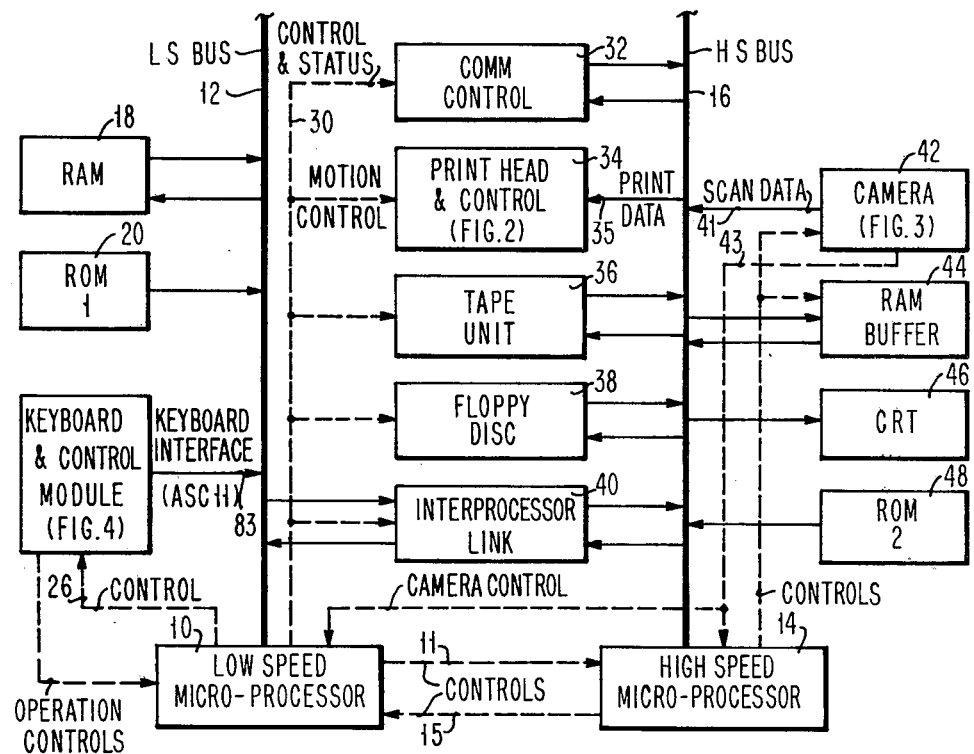
FIG. 1 is an overall block diagram of a selective scanning and copying system comprising a first embodiment of the present invention.

Referring now to FIG. 1, an overall block schematic diagram of a selective scanning and copying system comprising a first embodiment of the invention is shown. Data transfer between different parts of the system is controlled by a low speed microprocessor 10 connected to a low speed data bus 12 and a high speed microprocessor 14 having a high speed data bus 16. The low speed microprocessor (an Intel 8080 or similar type microprocessor) controls all overall system operations with the exception of the high speed data operations which are controlled by a high speed microprocessor. The high speed microprocessor (comprised of an Intel 3000 family computing elements or similar type microprocessor) operates in the 200 nanosecond range and its function is to control high speed data transfer. It also performs limited arithmetic operations for bit manipulation and data formatting. (Products of Intel Corp. referred to in this specification are described in the Intel 1976 Data Catalog, published by Intel Corp., 3065 Bowers Avenue, Santa Clara, CA 95051.)

A small capacity Intel random-access memory (RAM) 18 is connected to the low speed bus 12. This RAM is used as a variable storage for microprograms and is used to store variable font information under control of the keyboard.

An Intel read-only memory (ROM1) 20 stores the microprogram for the low speed microprocessor and also contains fixed font information for a standard character set.

A keyboard and control module 22 contains a typewriter keyboard, switches, and tab sets to allow an operator to initiate operations, input data, and control system operation.

Operation control lines 24 are provided to the low speed microprocessor and control lines 26 are provided from the low speed microprocessor to the control module 22.

The low speed microrprocessor provides a control bus 30 to control the communication control 32, the print head and control 34, the tape unit 36, the floppy disc 38, and the interprocessor link 40. These units have their data outputs connected to the high speed bus. Furthermore, the interprocessor link 40 has a connection to the low speed bus to provide for data transfers between the two buses under control of the micrprocessors.

Also connected to the high speed bus is a camera 42 which includes an analog-to-digital converter. The camera is a scanning device with a 256 and 512 element photosensor array with a digitizer, such as the type manufactured by Reticon Corp., Sunnyvale, CA 94086. One scan of data output occurs every 0.0025 inches of camera motion. A 4:1 data compression (i.e., a 2:1 compression in both the vertical and horizontal directions) is provided within the camera electronics to match printer resolution. Additional image processing is facilitated by the high density of object sampling.

A RAM buffer 44 is also connected to the high speed bus. This buffer is used for storage of high speed data and is a refresh buffer for the cathode ray tube 46. A read-only memory (ROM2) 48 is provided to store the microprogram for the high speed microprocessor 14.

The communication control 32 is a bidirectional input/output port for communication with external devices. For example, this communication control connects to a standard modem for connection over telephone lines to a computer.

The tape unit 36 provides for the external storage of input/output information such as format information and overflow buffer information from the RAM buffer 44. The tape motion control is provided by the low speed microprocessor, whereas the data input/output is over the high speed bus and is controlled by the high speed processor.

A further auxiliary storage is the floppy disc 38 (a Shugart SA900 or similar type floppy disc) which provides faster access for the same type of information stored in the tape unit 36. It is controlled by the low speed microprocessor and data transfer is controlled by the high speed microprocessor. The interprocessor link 40 allows communication between the low speed microprocessor and the high speed miroprocessor in order to synchronize the various operations.

PRINT HEAD AND CONTROL

Figure 2:
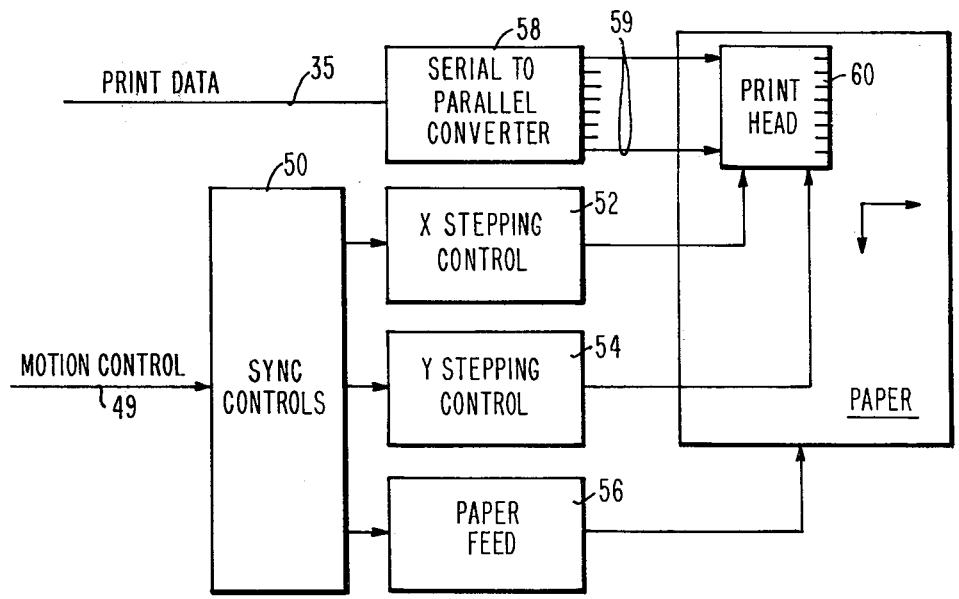
FIG. 2 is a more detailed block diagram of the print head and control logic of FIG. 1.

Referring now to FIG. 2, the print head and control 34 of FIG. 1 is shown in more detail. A nonimpact print head 60 is provided which employs thermal printing. The print head contains a vertical column of 128 heating elements (tantalum nitride thin film resistor elements on an insulating substrate) on 5 mil centers. The thermal printing head prints characters and pictures on heat-sensitive paper, producing a mosaic of dots, each of which is heated to about 300° C. by pulse-shaped signals. The size of each dot is about 3-4 mils in diameter. (An example of this type of print head is the thermal print head used in the Okifax 600, a facsimile device manufactured by Oki Electric Industry Company, Ltd., Tokyo, Japan.)

Serial print data 35 is supplied over the high speed bus under control of the high speed microprocessor and passes through a serial to parallel converter 58 which generates pulse-shaped signals 59 compatible with the printing elements of the print head 60. The thermal printer makes marks on the print paper in accordance with which of the input lines 59 are energized.

Motion control commands from the low speed processor are supplied over line 49 to synchronization controls 50. The commands are translated into signals to control the X stepping control 50 which causes the print head to move in a horizontal direction, Y stepping control 54 which causes the print head to move in the vertical direction, and paper feed 56 which causes a new sheet of paper to be fed under the print head.

As the print head 60 moves across the paper, a pattern of dots is produced based on the signals 59. Printing occurs with a resolution of 200 dots per inch in the X and Y directions.

This produces high resolution graphics and a typewriter quality alphanumerics in response to character patterns supplied over the print data line 35. Thus the output can be alphanumeric, graphs, pictures, maps, signatures, and other image data.

For example, conventional characters of 5×7 dots with one dot spacing between them can be generated, and since the print head is composed of a column of 128 heating elements it is possible to generate multiple rows of 5×7 alphanumerics at a time. Since each dot position is individually addressable, any combination of alphanumerics and graphics is possible for the printed output.

CAMERA

Figure 3:
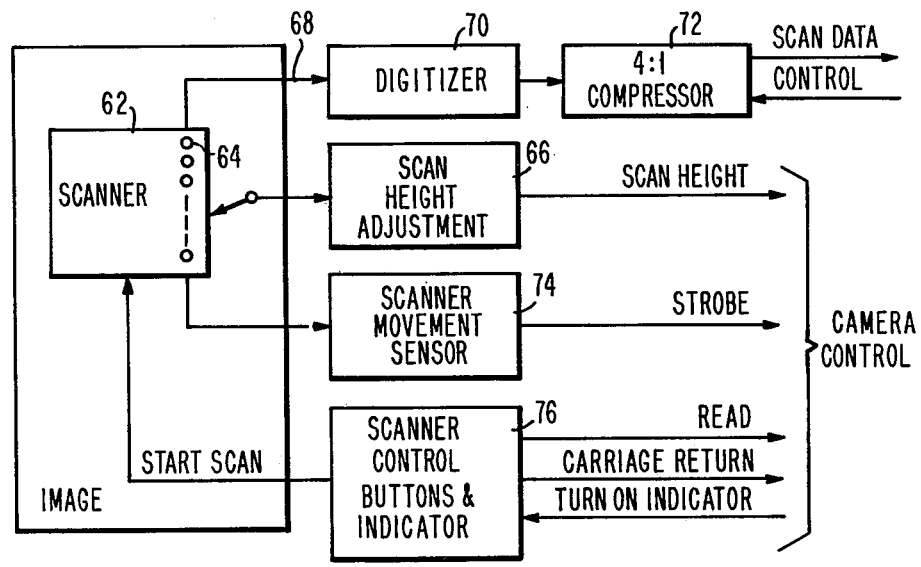
FIG. 3 is a more detailed block diagram of the camera logic block of FIG. 1.

Referring now to FIG. 3, the camera logic block 42 of FIG. 1 will be described. A scanner 62 and 256 elements 64 arranged in a vertical column. These elements are scanned in accordance with the scan height adjustment 66 to provide a serial output 68 to a digitizer 70 and a 4:1 compressor 72. The output is scan data which is supplied to the high speed data bus. As the scanner is moved across the image page, a strobe output is generated by the scanner movement sensor 74 every time the camera moves 0.0025 inches. The scanner is provided with control buttons 76, one of which when depressed by the operator activates scanner 62 and indicates that a read operation is taking place.

Another button is provided for carriage return so that the operator can control print head movement directly from the scanner while it is hand held.

Since a selective copying operation is manually performed, the scan increment can vary in size. In oder to prevent an overrun in the RAM buffer 44, the camera 42 is equipped with an indicator light and an audible tone to indicate to the user that the scanning operation must be interrupted until the transfer out of RAM 44 (to the tape unit, printer, etc.) is complete.

Hand-held scanners of the type just described are manufactured by Datacopy Corp., of Palo Alto, Calif.

KEYBOARD AND CONTROL MODULE

Figure 4:
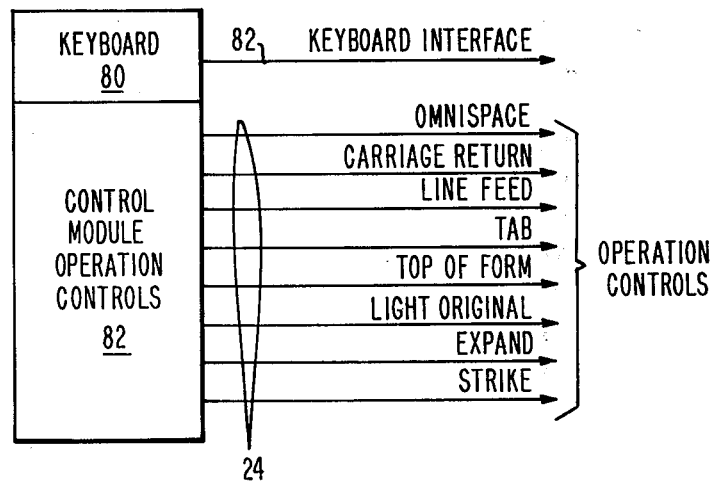
FIG. 4 is a more detailed diagram of the keyboard and control module block of FIG. 1.

Referring now to FIG. 4, the keyboard and operation controls will be described. The keyboard 80 provides a standard typewriter keyboard which outputs data in digital form over the keyboard interface 82. The data is in the form of an ASCII code which is convertible in RAM storage 18 to provide any font output which has been previously stored for each key on the keyboard.

The structure of a suitable keyboard and control module is shown in detail in the description of an off-the-shelf keyboard encoder circuit supplied by National Semiconductor under the part number MM5740 and described in the National Semiconductor 1976 data catalog published by National Semiconductor Corp., 2900 Semiconductor Drive, Santa Clara, California. The keyboard encoder is a complete keyboard interface system capable of encoding 90 single-pole single-throw switch closures into a usable 9-bit code, and provides for a direct TTL/DTL compatibility on data and strobe outputs without the use of any special interface components.

The connections to the keyboard and the pin assignments are shown in the above-referenced data manual. For example, the data strobe output pin 13 required to indicate that valid data has been entered by the keyboard and is ready for acceptance and the TTL compatible clock signal applied to pin 3, are included in the control line 26 shown in FIG. 1 between the low-speed microprocessor and the keyboard and control module. No interface circuitry is necessary since the MM5740 keyboard encoder is compatible with the Intel 8080 TTL logic. Furthermore, the keyboard and control module 22 requires no internal programming.

The clock signal for timing required between the keyboard and control module and the other modules of the system is supplied over the control line 26 from the low-speed microprocessor 10.

The control module operation controls 82 provide the following functions:

Omnispace—a four-way rocker switch provides for spacing either to the left or the right and to space up or down. For example, each left or right space is 0.1 inch and each up/down space is 0.125 inch.

Carriage return—returns the print head to the left margin which has been previously set by the margin set. Double activation of this key overrides the left margin and returns the print head to the extreme left edge.

Line feed—advances the print head in an amount determined by the value of the scan height adjustment setting on the camera without altering the print paper location. As an alternative, the print paper is moved with respect to the print head by the same amount.

Tab—this is a print head advance which moves the print head in tabulated steps. This allows the head to move to various predetermined columns.

Top of form—this switch advances the print paper with respect to the print head to set the beginning of a page.

Light original—this lowers the video detection threshold to record a faint original image on the document being copied. This remains activated until the next carriage return operation.

Expand—this function provides a two-to-one magnification of the original material.

Strike—this function provides an overwritten pattern rendering the original print unreadable over a swath determined by the scan height adjustment setting.

CAMERA TO PRINTER OPERATION

As the camera is moved over a line of information to be scanned, the data is placed on the high-speed bus 16 by the scan data output 41. Additionally, every 0.0025 inches of camera movement causes a strobe output on line 43 which is connected to both microprocessors. The low-speed microprocessor in response to the strobe signal synchronizes the movement of the print head shown in FIG. 2. The print head is caused to move in a horizontal direction from a point determined by the margin and tab settings.

The strobe line 43 to the high-speed microprocessor allows the high-speed microprocessor to control the transfer of the scanned data 41 to the RAM buffer 44. The RAM buffer also performs a smoothing operation to match the speed of the camera with the speed of the print head. Print data from the RAM buffer is transferred over the high-speed data bus to the print head and controls 34 over the print data line 35. As shown in FIG. 2, the print data is supplied to a serial-to-parallel converter 58 which energizes outputs 59 to the print head 60. This causes the printer to print a column which corresponds to the information scanned on the source document.

KEYBOARD TO PRINTER OPERATION

Initially, a font pattern for each key of the keyboard 22 is stored in the random-access memory 18. When a key on the keyboard is depressed, a coded representation of the key is transmitted over keyboard interface 82 to the random-access memory 18. The code is used to address RAM 18 and thus select one of the font patterns corresponding to the key depressed and this pattern is outputted to the low-speed bus 12. The font pattern is transferred over the interprocessor link 40 to the high-speed bus 16 and from the high-speed bus into the RAM buffer 44. The high-speed microprocessor then transfers the data from the RAM buffer 44 to the print head and control 34. A strobe signal indicating that the key has been struck is transferred over the operation control line 24 to the low-speed microprocessor 10. The low-speed microprocessor 10 then controls the motion of the print head 34 over the motion control line 30. The low-speed microprocessor synchronizes the entire operation by controlling the high-speed microprocessor over control line 11.

CAMERA TO COMMUNICATION CONTROL OPERATION

The scan data from the camera 42 passes over the scan data line 41 and onto the high-speed bus 16. The high-speed microprocessor compresses the data, and buffers enough data for a tape record into the RAM buffer 44. When a tape record has been accumulated, the data is loaded onto the tape unit 36. The high-speed microprocessor signals the low-speed microprocessor over control line 15 and the low-speed microprocessor establishes communication with the external device over the communication control 32. The tape record is then loaded back into the RAM buffer 44 and from the RAM buffer over the high-speed bus to the communication control where it is transmitted out over the commucation lines. Thus, the high-speed processor controls the overall data flow and compression whereas the low-speed microprocessor controls the establishing of communications and handles the slow-speed tape motion operations.

COMMUNICATION CONTROL TO PRINTER OPERATION

Information received from an external source passes through the communication control 32 and into the high-speed data bus 16. From the high-speed bus, the data is buffered in the RAM buffer 44 under control of the high-speed processor. When a full tape record has been loaded onto the RAM buffer, the high-speed microprocessor transfers the data to the tape unit 36 for temporary storage. At the completion of communication, the tape records stored stored in the tape unit are loaded back into the RAM buffer, expanded if necessary, and transferred from the RAM buffer to the print head and control over the high-speed data bus 16 and the print data line 35. Thus, the high-speed microprocessor controls the data flow and data expansion operation and the slow-speed microprocessor controls the overall operation and tape motion control.

CAMERA TO TAPE UNIT OPERATION

Scan data information received from the camera 42 over the line 41 is passed via the high-speed bus 16 to the RAM buffer 44 under control of the high-speed microprocessor. The high-speed microprocessor signals the low-speed microprocessor 10 that information for tape storage is ready for transfer. The low-speed microprocessor 10 starts the tape unit and data stored in the RAM buffer 44 is transferred via the high-speed bus 16 to the tape unit 36. The high-speed processor 14 having sensed the distance traveled by the camera 42 via the camera control lines 43 indicates to the low-speed processor the length of the data information being transferred. Thus, the tape is moved with respect to the tape recording head by an increment which bears a predetermined relationship to the scan increment of the camera.

As previously described, the camera 42 is equipped with an indicator light and audible tone to indicate to the user that scanning must be interrupted. This prevents an overrun in the RAM buffer 44 which could occur if the data has not yet been transferred to the tape unit.

LOW-SPEED MICROPROCESSOR 10

The Intel 8080 microprocessor is fully described beginning at page 8-3 of the Intel 1976 data catalog. As stated on page 8-3 the system (referred to generically as the MCS-80 Microcomputer System) provides LSI blocks that interface with one another through a standard system bus. This bus corresponds to the low-speed bus 12 shown in FIG. 1. The microprocessor chip has TTL drive capability which makes it fully compatible with the previously described National Semiconductor Keyboard encoder circuit.

The details of how the low-speed microprocessor is interconnected in the system shown in FIG. 1 are given on page 8-6 of the Intel data manual, which includes pin definitions. For example, the low-speed bus 12 connections correspond to pins D7-D0 for data and pins A15-A0 for address information. Data from the keyboard and control module enter the low-speed microprocessor over this data bus. This data bus provides bidirectional communication between the CPU, memory, and I/O devices for instructions and data transfers.

The ROM 20 and RAM 18 shown in FIG. 1 are provided by Intel for use with the 8080.

HIGH-SPEED MICROPROCESSOR 14

The high-speed microprocessor 14 is an Intel 3000 series microcomputer system or the equivalent. Its function is to control high-speed data transfer. The high-speed microprocessor 14 is connected via the high-speed bus to all of the input/output devices, the communication control 32, the print head and control 34, the tape unit 36, the floppy disc 38, the camera 42, and the cathode ray tube display 46. The series 3000 family of computing elements is specifically designed by Intel for high performance applications such as high-speed controllers. The entire component family has been designed to interconnect directly, minimizing the need for ancillary circuitry.

The 3000 series microcomputer system is TTL compatible and therefore is fully compatible with the low-speed microprocessor when the microprocessor is implemented with the Intel 8080 system.

The interconnections for the 3002 central processing unit (CPE) are shown on page 9-14 of the Intel data catalog. A functional block diagram showing the data buses is shown on page 9-15. The CPE provides a two-bit wide slice through a microprogrammed central processor and that therefore for an N-bit wide bus, (N/2) CPEs are wired together. For a standard 8-bit wide bus, four 3002 CPEs are wired together.

On page 9-15 of the Intel data catalog the M-bus and the I-bus inputs are described. The M inputs are arranged to bring data from an external main memory into the CPE. Therefore this is the bus that is used to bring data from the RAM buffer 44 into the CPE. The I-bus inputs are arranged to bring data from an external I/O system into the CPE. This permits a large number of I/O devices to be connected to the I-bus.

The high-speed bus 16 is comprised of the memory data-in lines N0, N1, etc., the data-out lines D0, D1, etc., and, the main memory-address lines A0, A1, etc., for addressing the RAM buffer 44. The I bus provides for an external-device input such as from the low-speed microprocessor over the line 11 corresponding to inputs I0, I1, etc. These lines connect to the D0-D7 lines of the 8080 microprocessor. These two microprocessors are designed to be compatible by Intel.

For data flow in the other direction over line 15 in FIG. 1 information flows from the M and D bus of the 3002 to the D0-D7 bus of the 8080. Information over the line 11 of FIG. 1 is from the memory-address bus A15-A0 and the data bus D7-D0 of the 8080 to the I bus of the 3000. The 3000 series computer is specifically designed to handle high-speed data transfers such as from a high-speed disc or other high-speed real-time I/O devices such as from a high resolution scanning device camera 42.

INTERPROCESSOR LINK 40

The interprocessor link 40 allows communication between the low-speed microprocessor and the high-speed microprocessor in order to synchronize the various operations. The circuitry within this block is supplied by Intel under the part number 3212 multimode latch buffer described on page 9-26 of the above-identified Intel data catalog. A logic diagram is shown on page 9-28 of the Intel data catalog and the bus connections are shown for an 8-bit wide data bus. The control lines corresponding to control line 30 of FIG. 1 are also shown and described by their function and the pin connections.

CATHODE RAY TUBE 46

A suitable cathode ray tube display is described in the Intel data catalog on page 6-22. This device is TTL compatible, and is connected to the Intel 3000 series computer by means of the data bus.

PROGRAMMING FOR THE LOW-SPEED MICROPROCESSOR 10 AND THE HIGH-SPEED MICROPROCESSOR 14

Programming is not necessary in any of the devices shown in FIG. 1 with the exception of the low-speed microprocessor 10 and the high-speed microprocessor 14. All the other blocks are either input/output devices, or memories and these devices are passive, unintelligent devices which require instruction and control from a main programmed computer.

Intel provides a microcomputer development system for supporting product design from program development through prototype debug to production and field test. One such product has been provided for both the MCS-80 (the 8080 microprocessor) and the series 3000 microcomputer systems.

The development system is called the MDS-800 Intellec MDS and is described beginning at page 10-3 of the Intel data catalog. In addition to providing all the necessary control and data transfer circuitry to interface with peripherals, such as CRT, line printer, and PROM programmer, the MDS system includes diagnostic capabilities for user-configured systems. It also includes debug functions such as tracing program flow, single stepping, and examining and altering CPU registers in memory locations.

Figure 6:
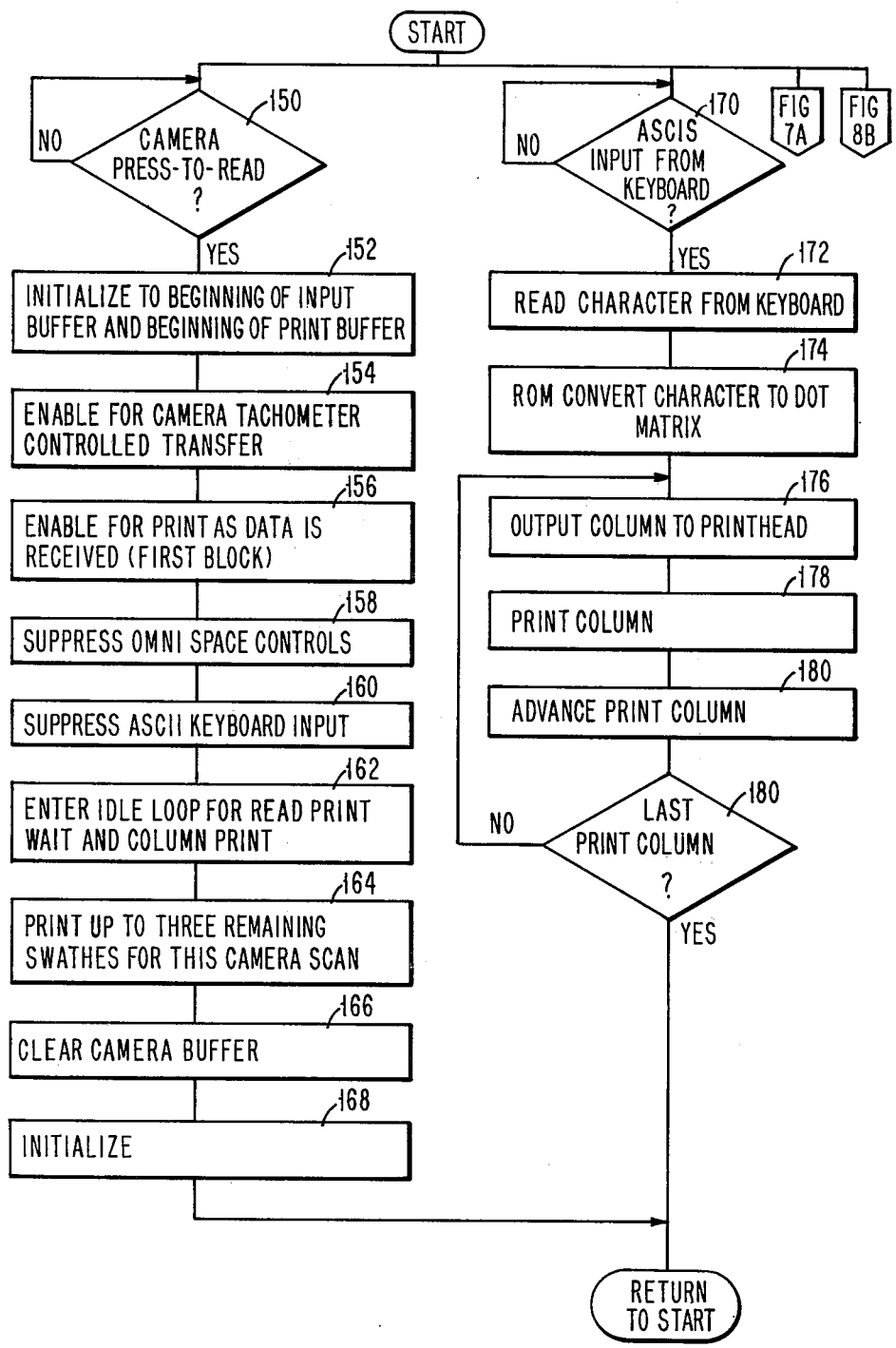
Figure 7:
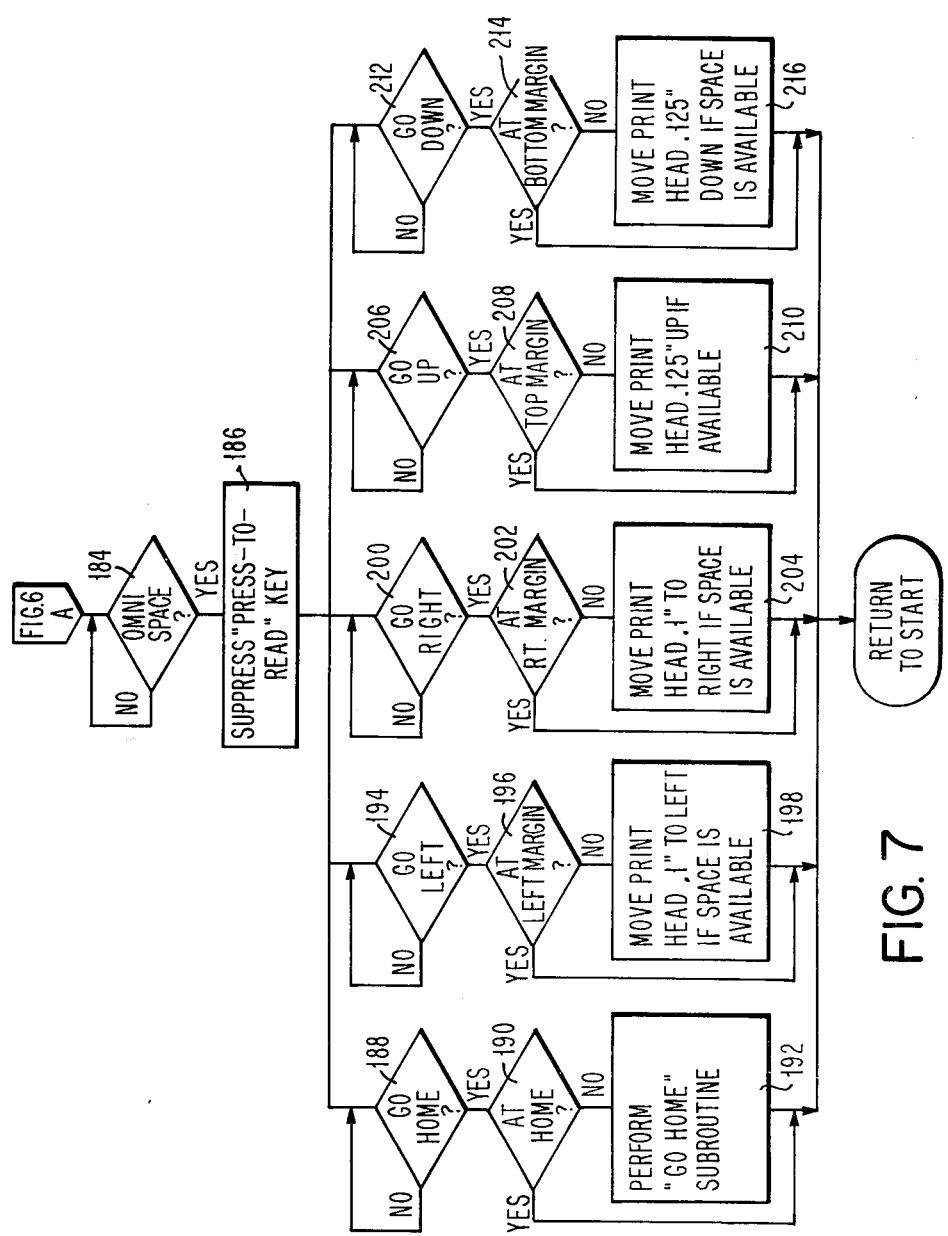

Intel contemplates the use of its 8080 microprocessor in conjunction with its 3000 series computer as an intelligent controller and the implementation of such a system is supported by the MDS-800 development system. The development of microprograms to perform the functions specified require no more than routine coding. The program described in the flow charts of FIG. 6 through FIG. 7 illustrates a suitable program which can be readily reduced to Intel 8080 microprocessor compatible user's code, by one having ordinary skill in the art. This program flow is described after the following description of a second embodiment of the invention. A source code listing is provided in APPENDIX II and APPENDIX III. This code is in a large language which is compatible with the Texas Instruments TM-990/100 M microcomputer described subsequently with respect to the second embodiment of the invention. One skilled in microprogramming can utilize the code listing to produce a similar code listing compatible with the Intel microprocessor's described with respect to FIG. 1.

DESCRIPTION OF SECOND EMBODIMENT

Figure 5:
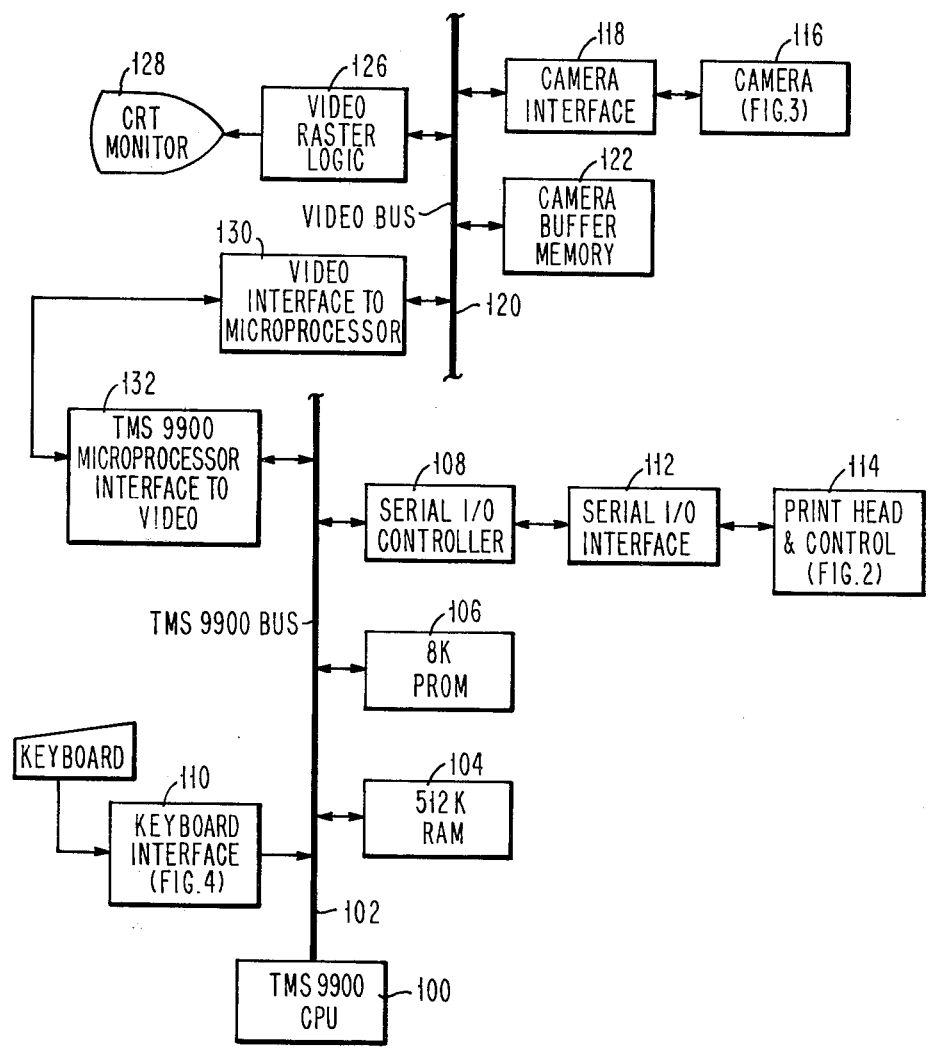
FIG. 5 is an overall block diagram of a selective scanning and copying system comprising a second experiment of the present invention; and, FIGS. 6-8 are a flow chart of microprogramming for the microprocessors shown in FIGS. 1 and 5.

Referring now to FIG. 5, an overall block schematic diagram of a selective scanning and copying system comprising a second embodiment of the invention is shown. Data transfer between different parts of the system is controlled by a microprocessor 100 which is connected to a data bus, 102. The microprocessor is a TMS-9900, which is part of the TM-990/100 M microcomputer system manufactured by Texas Instruments, Houston, Tex. Other parts of the system include RAM 104, a programmable ROM 106, and serial I/O controller 108. A keyboard and display 110, which is compatible with the microcomputer is Model L-1500, manufactured by Keytronic of Spokane, Wash. This keyboard provides the IBM-3277 interactional terminal with a visual display. The functions described with respect to the keyboard and control module of FIG. 4 are implemented along with other key functions shown in APPENDIX I.

PRINTHEAD AND CONTROL

The printhead and control, 114, is shown in detail in FIG. 2 and has been described previously with respect to that figure. The printhead and control, 114, is attached to a serial I/O interface, 112, which provides the appropriate signal levels to attach to the serial I/O controller of the microcomputer system.

CAMERA CONTROLS

The camera, 116, has been described previously with respect to FIG. 3. A push-to-read switch is located on the camera and is depressed to prepare the camera for scanning images. Scanning is effected by moving the camera from left to right in a continuous motion. If the camera movement is stopped, or text wider than 4.25 inches is scanned, the microprocessor begins a data reduction cycle and displays or prints the processed image.

The camera, 116, is connected to a camera interface and processor, 118, which provides appropriate interfacing to a video bus, 120. The output from the camera signal processor is a serial 512-bit data stream, representing one line scan. The camera interface, 118, collects four scans and then writes this data into a camera buffer memory, 122, which is also connected to the video bus, 120. The data is written into the buffer memory in 4×4 bit cells, using 128 write cycles and are temporarily stored in first-in, first-out registers.

VIDEO SUBSYSTEM

The video subsystem is comprised of video raster logic, 126, with interfaces a cathode ray tube (CRT) monitor, 128, with the video bus, 120. Also included is a video-interface-to-microprocessor logic, 130, which matches the signal levels to the TMS-9900 microprocessor-interface-to-video logic, 132. These interfaces are specified by the manufactures of the apparatus. A suitable video subsystem for use with the TMS-9900 microprocessor is the Model 3408 high-resolution graphics terminal manufactured by Data Copy Corporation of Palo Alto, Calif. The Model 3408 comprises four subsystems including a CRT monitor, display generator, TI-9900 microprocessor, and power supply, and is specifically designed to operate in a system as contemplated by applicant's FIG. 5. The image information is stored in a random-access memory, which is part of the display generator, in order to allow for continuous display refresh.

MICROPROCESSOR SUBSYSTEM AND MICROPROGRAMMING

As referenced previously, the microprocessor is a Texas Instruments TMS-9900 contained on a TM-990/100 M microcomputer board. Also included on the board is a PROM, 106, containing 32K bytes of microcode; 512 bytes of random-access memory, RAM, storage, 104, two programmable integral timers, and a serial interface 108, 112.

The programmed microprocessor performs several functions in the system including:

1. Clearing the CRT screen.
2. Setting tabs and margins.
3. Generating displayed characters from keyboard input.
4. Providing a cursor.
5. Processing of camera data to generate actual-size images. The microprocessor programming accomplishes this 16:1 reduction in data using a simple averaging algorithm.

VIDEO BUS TO TMS-9900 BUS INTERFACE

The interface between the video bus, 120, and the TMS-9900 bus, 102, is comprised of two logic blocks, 130 and 132. The microprocessor 100 is the controlling element with the video bus appearing as an I/O port. Sixteen bidirectional address and data lines and seven control lines pass between the two interfaces as specified by the above-mentioned Texas Instruments manufacturer.

The microprocessor accesses a 4×4 bit picture element by first sending the row, column, and bank of the designated square. Once row, column, and bank have been established, the microprocessor can either read the data or write new data into the picture element, and the CRT monitor will instantly show any changes in data.

CAMERA-TO-VIDEO OPERATION

The details of the camera operation have been described previously with respect to FIG. 3. The line-scanning operation of the 512 element linear array within the camera, 116, is controlled by camera interface logic, 118. The output from the camera interface logic, 118, is a serial 512-bit data stream representing one line scan. The camera interface, 118, collects four scans and then writes them into the camera buffer memory, 122, in 4×4 bit cells using 128 write cycles. The camera interface, 118, also generates the addresses required to write the data into the buffer memory, 122. Once the data is stored in the camera buffer memory, 122, it is available for display on the CRT monitor, 128. The video raster logic, 126, contains a timing circuit which is the source for all the timing signals used by the camera buffer memory, 122, and the CRT, 128. During a memory access by the video raster logic, 126, the camera buffer memory, 122, is read with the resulting data being put into shift registers within the logic, 126. These registers hold image data and cursor information. The data-bit streams are converted to appropriate voltage levels and buffered to drive the video inputs of the CRT monitor, 128. The video raster logic, 126, also generates the synchronization pulses needed by the CRT, 128.

MICROPROGRAMMING

Figure 8:
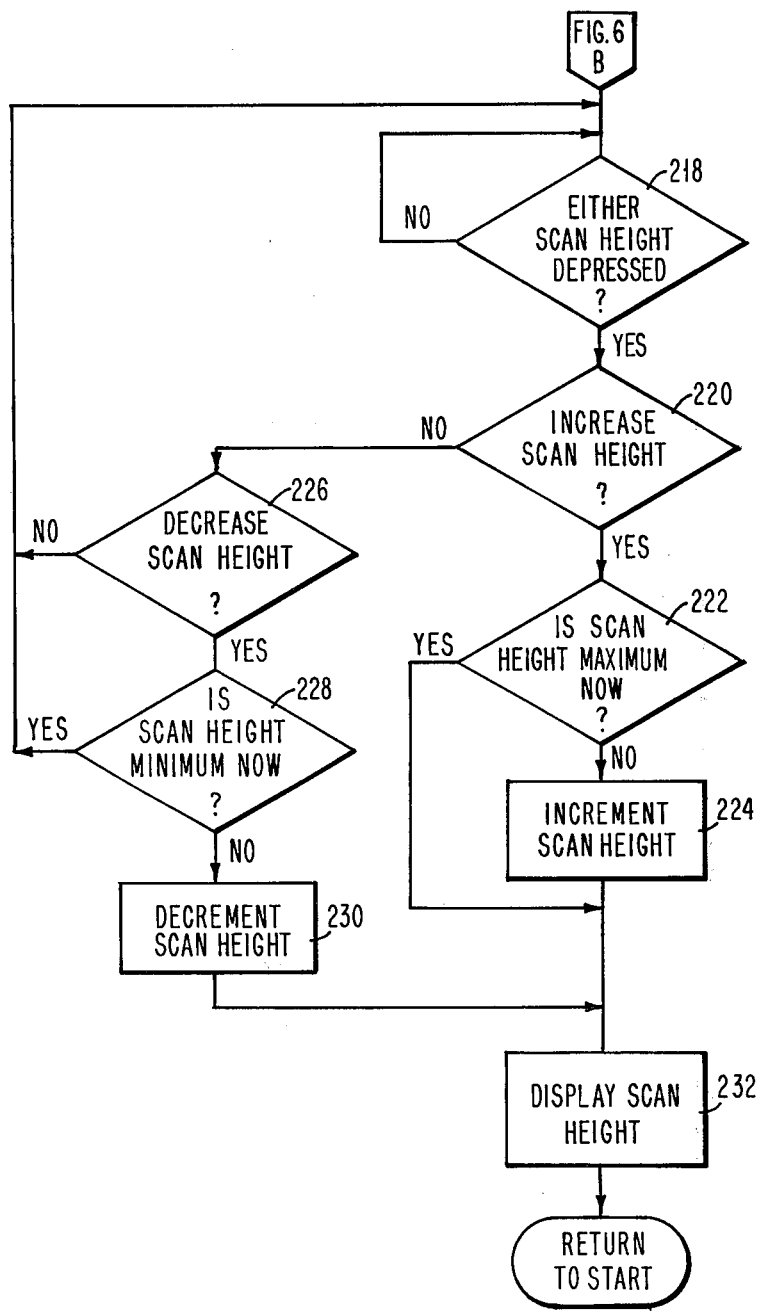

Referring now to FIGS. 6–8, the microprogramming for the preferred embodiment shown in FIG. 1 and for the embodiment shown in FIG. 5 will be described. The programming performs the functions of scanning an arbitrary area on a source document, printing that area anywhere specified on a print paper or video display, and receiving data from a keyboard and outputting the data to a print head or display. The programming also provides for moving the data in X-Y directions on the output device (the printer or video display) including the functions of setting tabs, margins, and selectively changing them. Also included is the function of changing the scan height of the scanner. The embodiment of FIG. 1 is preferred because it employs a high-speed microprocessor, 14, used as a high-speed input/output controller to obtain higher performance with respect to the camera-to-print-head operations. The embodiment of FIG. 5 is functionally identical to the configuration of FIG. 1 with the exception that the high-speed microprocessor controller is not utilized. Therefore, the interprocessor link, 40, shown in FIG. 1 is essentially a short circuit connecting both the high-speed bus and the low-speed bus together. This enables the input/output devices to operate over a single bus, but at a lower speed than would be possible were a high-speed microprocessor control utilized. The net result is a camera-scanning operation which is slower than would be possible with the configuration of FIG. 1. Only the camera and camera buffer memory, 122, run together at high speed on a direct-memory access basis, the data being transferred to the print head and control by means of the video interface to microprocessor data path.

Referring to FIGS. 6, 7, and 8, an overview of the microprogram data flow will now be described. The flow starts on FIG. 6 with the program examining various inputs in the system. If the camera press-to-read button, decision block 150, is activated the flow proceeds to block 152, which initializes the camera buffer memory, 122, to its beginning and the RAM 104 to the beginning of the print buffer area set aside therein. The flow controls to block 154, which enables the system for camera tachometer controlled data transfer. The flow continues to block 156, which enables the system for printing as data is received from the camera buffer memory, 122. At decision block 158 the omnispace controls (to be described with respect to FIG. 7) are suppressed. At block 160 the keyboard input is suppressed so that the ASCII characters are inhibited. The program flow now proceeds to block 162 and enters an idle loop. In this loop data are transferred from the camera, is converted from serial data to parallel, and the printer prints a column which corresponds to the information scanned on the source document. The flow continues to block 164, in which up to three remaining swathes for the camera scan are printed. The camera buffer is then cleared at block 166 and the flow returns to the initialize step, 168, to initialize to the beginning of the input buffer and the beginning of the print buffer.

While not shown in this flow chart, the microcode of APPENDIX II performs a similar operation to display the scanned data on the CRT.

Referring again to FIG. 6, assume that there is an ASCII input from the keyboard and that therefore the decision out of block 170 is yes. In this event the program controls the reading of a character from the keyboard at block 172. The read-only memory (20 of FIG. 1, or 106 of FIG. 5) converts the ASCII characters to a dot matrix format in block 174. In block 176, a column of the dot matrix is outputted to the print head. In block 178 the column is printed, and in block 180 the programming advances to the next print column and the print head is moved accordingly. At block 182 the loop is repeated until the last print column is printed in which event the program returns to the starting point. A similar operation takes place in the microcode with respect to displaying the information on the CRT monitor.

Referring to FIG. 7, the program flow for the omnispace control will be described. The omnispace control is a four-way rocker switch, or pushbutton switches, which provide for spacing either to the left or to the right, and to space up or down, in order to control independent movement of the print head. A similar operation is performed with respect to the CRT by means of a cursor, which is a movable spot of light that indicates where the next character will be entered. If the omnispace is activated, the decision out of block 184 leads to block 186 which suppresses the press-to-read key. Five possible functions, go home, go left, go right, go up, and go down are represented by the five different flow paths of FIG. 7. If the omnispace key indicates go home at block 188 and the print head is not at the home position, block 190, the program performs a go home subroutine, block 192. If the omnispace key indicates go left at decision block 194 and the print head is not at the left margin, block 196, then the program performs a subroutine which moves the print head one-tenth of an inch to the left, if space is available, block 198. A similar flow occurs if the omnispace button indicates go right at block 200. If the print head is not at the right margin, block 202, then the program enters a subroutine, block 204, to move the print head to the right.

If the omnispace key indicates go up, as represented by decision block 206, and if the print head is not already at the top margin, block 208, then the program enters a subroutine, block 210, to move the print head 0.125 inches up if space is available.

A similar flow occurs if the omnispace button indicates go down, block 212. If the print head is not already at the bottom margin, block 214, the microprogramming enters a subroutine to move the print head down, block 216.

Referring now to FIG. 8, the microprogram flow for interpreting the scan height will be described. The first decision block, 218, determines whether either one of the scan height keys is depressed. If the increase scan height key is depressed, the logic flow is from block 220 to block 222. If the scan height is not at its maximum, the flow proceeds from block 222 to 224, in which case the microprogramming increments the scan height at the printer or at the video display. If the decrease scan height key is depressed, the flow proceeds from block 226 to block 228. If the scan height is not at its minimum height, the output from block 228 proceeds to block 230 in which case the program decrements the scan height. The flow proceeds to block 232 wherein the program displays the scan height at the keyboard output.

A complete microcode listing, which will run on a TM-9900 microprocessor is shown in APPENDIX II. What follows is a brief description of each subroutine used in that microprogram.

POWAON: This is entered at power-on and sets up the scan height increment, the standard band to be displayed, and the standard cursor blink time. Of these, only the displayed bank may be varied by the operator subsequently. The program than flows to TBMRGNRELES.

TBMRGNRELES: This can also be reached by depressing the keyboard key #64 (see APPENDIX I for key assignments) which will effectively reset to power-on conditions everything except the currently displayed bank. The margins and tabs are all released, and the extreme hardware margins are implemented.

Video is initialized here for white-on-black display of input characters (camera images are always black-on-white). Control now drops through to CLEARTN.

CLEARTN: May also be reached by keying #1 on the keyboard. Depending on the status of the reverse video setting, the currently displayed memory bank only is either cleared or set, i.e., darkened or lit. Control then flows to HOME.

HOME: May also be reached by keying #32 on the keyboard. The subroutine to allow subsequent camera motion detection is called on the keyboard. The cursor position is initialized to the upper-left corner of the screen and control drops through to CARETN.

CARETN: May also be reached by keying the carriage return key on the keyboard. The cursor horizontal position is arbitrarily set to the left software margin value. As this carriage return always includes a line feed, control now flows to LINEFEED. Do not confuse this routine with that of camera carriage return.

LINEFEED: May also be reached by keying the index button on the keyboard. The cursor vertical position is decremented by one line (160 mils). If this would be below the bottom of the screen, the cursor is reset to the home position. The cursor vertical position is displayed on the numeric display by calling subroutine CNVTM. Control drops through to SAVECURSE.

SAVECURSE: This point is also reached after completion of any processing for camera input or on completion of any keyboard input. The data at the cursor location (16 spots down and 16 spots to the right) is saved and its complement is saved. The cursor blink time routine is initialized, and control drops through to NOACTION.

NOACTION: This routine continuously tests for keyboard input alternated by tests for camera input. If either occurs, the first action will be to ensure the cursor is replaced by the original data. While neither occurs, a counter counts down the blink time and at timeout calls BLINKURSR to swap the data at the cursor location with its complement. If no camera or keyboard input occurs, this loop will continue indefinitely. If keyboard input occurs, control transfers to ISCHAR. If camera input occurs, control transfers to CAMERIN.

ISCHAR: immediately calls CURSREST to ensure the original data is restored before any modifications are made. The character is then input from the keyboard and tested to see if it is one of the control characters, if so, control transfers to the appropriate routine. If not a control character and if space exists to generate a character in, then subroutine PCHAR is called to generate the character. Following this, if insufficient space exists for another character to the right of the most recent one, then a carriage return and linefeed are generated automatically. Otherwise control is transferred to SAVECURS (defined earlier).

PCHAR: is a subroutine to generate a character. At the current cursor position all characters are 9 bits wide and 16 bits high. Because the 4×4 bit cell array is not a submultiple of nine, the bits have to be shifted appropriately depending on the bit address of the cursor currently.

CAMERIN: is reached only from NOACTION (this is not a subroutine) and initially uses CURSREST to ensure the cursor is removed and the original data restored. First this section determines the length of the scan.

If the camera interface fails to transfer data for more than one msec since the previous transfer, the routine times out and begins to shrink the data by 4:1 linearly (16 to 1 by area). This is performed columnwise, top to bottom (to the assigned scan height), in groups of 16 cells of 4×4 bits. Each 4×4 cell in the original camera data determines one bit in the resultant display of the scanned area. This is achieved by counting the number of nonzero bits in the original cell and if this count is greater than the threshold, a one is placed in the result, else a zero.

For typewritten material this threshold should be biased to save ones, but for 50% black images (e.g., pictures) probably 50% of the cell size (i.e., 8) would be better.

BANKSET: A second character is input and its low three bits are used to set the bank to be displayed.

SCNDWN: decreases the current scan height setting by one increment, i.e., 16 counts. The routine allows a minimum height of one cell (i.e., 4 bits). The CNVTM subroutine is called to display the current scan height.

SCNUP: increases the current scan height setting by one increment (i.e, 16 counts), but the maximum of 128 cells (512 counts) cannot be exceeded. This shares code with SCNDN.

RELLFT: will assign a software left margin unless present cursor location is equal to the left margin previously set, in which case the left margin will reset to zero.

RELRIT: Same as RELLFT, but for the right software margin.

RETCAM: Code for the camera carriage return function which is equivalent to a normal carriage return but with a line feed equal in height to the current scan height setting.

CLEAR: Code to set all of the currently displayed bank to all zeros or all ones depending on the current reverse video mode.

STCAMDET: Subroutine to set a horizontal line containing the recognition code so that subsequent data stored by the camera interface will alter this data and allow detection of depression of the press-to-read button and subsequent camera movement.

TABIT: Code to determine the location to tab to from the unordered table of all assigned tabstops.

SETAB: Code to find if a current tab already has the same value as the cursor and if so to delete it. If none is equal, and no more room in table, to ignore it, otherwise to add the current cursor location to the tab table to define a tap stop for the future.

BLINKURSR: Subroutine to swap the contents of the 16 4×4 cells at the current cursor location with their alternate (complemented) values, hence blinking the cursor.

While the invention has been particularly shown and described with reference to preferred embodiments thereof, it will be understood by those skilled in the art that various changes in form and details may be made therein without departing from the spirit and scope of the invention.

APPENDIX I
KEYBOARD PROM

| Address | Data | Function | Key # |
| --- | --- | --- | --- |
| 00 | 00 | | |
| 01 | 00 | Suppressed RESET | 64 |
| 02 | 00 | | |
| 03 | 00 | | |
| 04 | 00 | | |
| 05 | 00 | | |
| 06 | 00 | | |
| 07 | 00 | | |
| 08 | 0C | Clear | 1 |
| 09 | 0D | Bank | 17 |
| 0A | 15 | Scan ht. incr | 33 |
| 0B | 16 | Scan ht. decr | 49 |
| 0C | 7A | z | 51 |
| 0D | 61 | a | 35 |
| 0E | 71 | q | 19 |

APPENDIX I
KEYBOARD PROM

| Address | Data | Function | Key # |
|---------|------|----------|-------|
| 0F | 31 | 1 | 2 |
| 10 | 32 | 2 | 3 |
| 11 | 77 | w | 20 |
| 12 | 64 | d | 37 |
| 13 | 78 | x | 52 |
| 14 | 63 | c | 53 |
| 15 | 73 | s | 36 |
| 16 | 65 | e | 21 |
| 17 | 33 | 3 | 4 |
| 18 | 34 | 4 | 5 |
| 19 | 72 | r | 22 |
| 1A | 67 | g | 39 |
| 1B | 76 | v | 54 |
| 1C | 62 | b | 55 |
| 1D | 66 | f | 38 |
| 1E | 74 | t | 23 |
| 1F | 35 | 5 | 6 |
| 20 | 36 | 6 | 7 |
| 21 | 79 | y | 24 |
| 22 | 6A | j | 41 |
| 23 | 6E | n | 56 |
| 24 | 6D | m | 57 |
| 25 | 68 | h | 40 |
| 26 | 75 | u | 25 |
| 27 | 37 | 7 | 8 |
| 28 | 38 | 8 | 9 |
| 29 | 69 | i | 26 |
| 2A | 6C | l | 43 |
| 2B | 2C | , | 58 |
| 2C | 2E | . | 59 |
| 2D | 6B | k | 42 |
| 2E | 6F | o | 27 |
| 2F | 39 | 9 | 10 |
| 30 | 30 | 0 | 11 |
| 31 | 05 | INDEX | 29 |
| 32 | 70 | p | 28 |
| 33 | 2F | / | 60 |
| 34 | 1D | REVERSE VIDEO | 66 |
| 35 | 27 | ' | 45 |
| 36 | 06 | CAM CAR RETURN | 30 |
| 37 | 3D | = | 13 |
| 38 | 00 | | |
| 39 | 00 | | |
| 3A | 00 | | |
| 3B | 00 | | |
| 3C | 00 | | |
| 3D | 00 | | |
| 3E | 01 | TAB SET/CLEAR | 31 |
| 3F | 0F | LEFT MARGIN | 15 |
| 40 | 00 | | |
| . | . | | |
| 4F | 00 | | |
| 50 | 00 | | |
| . | . | | |
| 59 | 00 | | |
| 5A | 3B | ; | 44 |
| 5B | 00 | | |
| . | . | | |
| 5F | 00 | | |
| 60 | 1B | Character Generator | 14 |
| 61 | 20 | Space | 65 |
| 62 | 1A | Omnispace up | 47 |
| 63 | 08 | Omnispace left | 62 |
| 64 | 18 | Omnispace right | 63 |
| 65 | 0A | Omnispace down | 48 |
| 66 | 14 | Carriage return | 46 |
| 67 | 2D | - | 12 |
| 68 | 00 | | |
| . | . | | |
| 6D | 00 | | |
| 6E | 09 | TAB | 18 |
| 6F | 00 | | |
| 70 | 00 | | |
| . | . | | |
| 75 | 00 | | |
| 76 | 0B | HOME | 32 |
| 77 | 02 | RIGHT MARGIN | 16 |
| 78 | 00 | | |
| . | . | | |
| 7F | 00 | | |
| 80 | 00 | | |
| 81 | 07 | RESET | 64 |
| 82 | 00 | | |
| . | . | | |
| 87 | 00 | | |
| 88 | 0C | CLEAR | 1 |
| 89 | 0D | BANK | 17 |
| 8A | 15 | SCAN HT INCR | 33 |
| 8B | 16 | SCAN HT DECR | 49 |
| 8C | 5A | Z | 51 |
| 8D | 41 | A | 35 |
| 8E | 51 | Q | 19 |
| 8F | 21 | ! | 2 |
| 90 | 40 | @ | 3 |
| 91 | 57 | W | 20 |
| 92 | 44 | D | 37 |
| 93 | 58 | X | 52 |
| 94 | 43 | C | 53 |
| 95 | 53 | S | 36 |
| 96 | 45 | E | 21 |
| 97 | 23 | # | 4 |
| 98 | 24 | $ | 5 |
| 99 | 52 | R | 22 |
| 9A | 47 | G | 39 |
| 9B | 56 | V | 54 |
| 9C | 42 | B | 55 |
| 9D | 46 | F | 38 |
| 9E | 54 | T | 23 |
| 9F | 25 | % | 6 |
| A0 | 7E | ¢ | 7 |
| A1 | 59 | Y | 24 |
| A2 | 4A | J | 41 |
| A3 | 4E | N | 56 |
| A4 | 4D | M | 57 |
| A5 | 48 | H | 40 |
| A6 | 55 | U | 25 |
| A7 | 26 | & | 8 |
| A8 | 2A | * | 9 |
| A9 | 49 | I | 26 |
| AA | 4C | L | 43 |
| AB | 3C | Less than | 58 |
| AC | 3E | Greater than | 59 |
| AD | 4B | K | 42 |
| AE | 4F | O | 27 |
| AF | 28 | ( | 10 |
| B0 | 29 | ) | 11 |
| B1 | 05 | INDEX | 29 |
| B2 | 50 | P | 28 |
| B3 | 3F | ? | 60 |
| B4 | 1D | REVERSE VIDEO | 66 |
| B5 | 22 | " | 45 |
| B6 | 06 | CAM CAR RETURN | 30 |
| B7 | 2B | + | 13 |
| B8 | 00 | | |
| . | . | | |
| BD | 00 | | |
| BE | 01 | TAB SET/CLEAR | 31 |
| BF | 0F | LEFT MARGIN | 15 |
| C0 | 00 | | |

APPENDIX I
KEYBOARD PROM

| Address | Data | Function | Key # |
|---------|------|----------|-------|
| . | . | | |
| D9 | 00 | | |
| DA | 3A | : | 44 |
| DB | 00 | | |
| . | . | | |
| DF | 00 | | |
| E0 | 9F | TIBUG Mode | 14 |
| E1 | 20 | Space | 65 |
| E2 | 1A | Omnispace up | 47 |
| E3 | 08 | Omnispace left | 47 |
| E4 | 18 | omnispace right | 63 |
| E5 | 0A | Omnispace down | 48 |
| E6 | 14 | Carriage return | 46 |
| E7 | 5F | - | 12 |
| E8 | 00 | | |

APPENDIX I
KEYBOARD PROM

| Address | Data | Function | Key # |
|---------|------|----------|-------|
| . | . | | |
| ED | 00 | | |
| EE | 09 | TAB | 18 |
| EF | 00 | | |
| F0 | 00 | | |
| . | . | | |
| F5 | 00 | | |
| F6 | 0B | HOME | 32 |
| F7 | 02 | RIGHT MARGIN | 16 |
| F8 | 00 | | |
| . | . | | |
| FF | 00 | | |

APPENDIX II
MICROCODE FOR CRT OUTPUT ROM

| Address | Data | Label | Op | Operand |
|---------|------|-------|----|---------|
| 1000 | 0460 1050 | BEGIN | B | POWAON |
| 1004 | FF70 | ORIGDAL | DEF | SAVORIG |
| 1006 | FF50 | CURSDAL | DEF | CURSOR CELLS |
| 1008 | 03E8 | OTCURS | DEC | 1000 |
| 100A | 0002 | CAMBANK | DEC | 2 |
| 100C | 0004 | D4 | DEC | 4 |
| 100E | 0350 | COLOVR | DEC | 848 |
| 1010 | 00FF | LOBYT | HEX | 00FF |
| 1012 | FF2E | DFTABL | DEF | LFTMRGN |
| 1014 | 0010 | MAXTB | DEC | 16 |
| 1016 | 0008 | D8 | DEC | 8 |
| 1018 | 3132 | ASC1ASC2 | ASC | 12 |
| 101A | 0080 | MXSCAN | DEC | 512 |
| 101C | 842E | RECOGNIS | HEX | 842F |
| 101E | 047B | MAXROCR | DEC | 1147 |
| 1020 | 011C | MAXROCEL | HEX | 11C |
| 1022 | 00D4 | MAXCLCEL | HEX | D4 |
| 1024 | 0010 | D16 | DEC | 16 |
| 1026 | FF4E | DFRITMRG | DEF | RITEMRGN |
| 1028 | 046B | MAXRO | DEC | 1131 |
| 102A | 0009 | D9 | DEC | 9 |
| 102C | 0020 | D32 | DEC | 32 |
| 102E | 0012 | D18 | DEC | 18 |
| 1030 | 0086 | MEANRCEL | HEX | 86 |
| 1032 | 00D0 | D200 | DEC | 200 |
| 1034 | 0002 | D2 | DEC | 2 |
| 1036 | 1FE0 | IOAD | HEX | 1FE0 |
| 1038 | 0B0D | HOMCHR | HEX | 0B0D |
| 103A | 1DFF FEFF FFFF | VIDCHR | | |
| 1040 | 0CFF | CLR/SCAL | HEX | 0CFF |
| 1042 | 1615 | SCNDN/UP | HEX | 1615 |
| 1044 | 0701 | RMRGTBST | HEX | 0701 |
| 1046 | 0F02 | LTRLRTRL | HEX | 0F02 |
| 1048 | 9F1B | SWTCHCGN | HEX | 9F1B |
| 104A | 0614 | CMCRTCRT | HEX | 0614 |
| 104C | 0509 | LNFDTAB | HEX | 0509 |
| 104E | 0A1A | DN/UPCHR | HEX | 0A1A |
| 1050 | C820 1016 FFAA | POWAON | MOV | SCNINC,D8 |
| 1056 | C820 1008 FFA2 | | MOV | TCURS,OTCURS |
| 105C | C820 17E8 FFA8 | | MOV | SHOBANK,D3 |
| 1062 | 04E0 FF2C 1000 1000 | TBMRNRLS | CLR | LFTMRGIN |
| 106A | C120 | | MOV | R4,DFTABL |

APPENDIX II-continued
MICROCODE FOR CRT OUTPUT ROM

| | | | | |
|---|---|---|---|---|
| 106E | C160 1012 | | MOV | R5,MAXTB |
| 1072 | 04F4 1014 | TABZRO | CLR | (R4,I+) |
| 1074 | 0605 | | DEC | R5 |
| 1076 | 18FD | | JOC | TABZRO |
| 1078 | C820 100E FF4E | | MOV | RITMRGN,COLOVR |
| 107E | C820 101A FFAC | | MOV | SCANHT,MXSCAN |
| 1084 | 04E0 FF2A | | CLR | STCH |
| 1088 | C820 FFA8 8006 | CLEARTN | MOV | BANK,SHOBANK |
| 108E | 06A0 1384 | | BAL | CLEAR |
| 1092 | 06A0 14BA | HOME | BAL | STCAMDET |
| 1096 | C820 101E FF26 | | MOV | CURSRO,MAXROCR |
| 109C | 0460 10E0 | | | |
| 10A0 | C0A0 FF26 | LINEFEED | MOV | R2,CURSRO |
| 10A4 | 60A0 1024 | | SUB | R2,D16 |
| 10A8 | C142 | | MOV | R5,R2 |
| 10AA | 6160 1024 | | SUB | R5,D16 |
| 10AE | 11E7 | | JLT | HOME |
| 10B0 | C802 FF26 | SHORO | MOV | CURSRO,R2 |
| 10B4 | C1E0 17F4 | | MOV | R7,D8 |
| 10B8 | 1001 1B06 | | JMP | *+1 |
| 10BC | C0A0 FF24 | SAVECURS | MOV | R2,CURSCO |
| 10C0 | C1E0 100C | | MOV | R7,D4 |
| 10C4 | 1001 1B06 | | JMP | *+1 |
| 10C8 | C0E0 FF24 | | MOV | R3,CURSCO |
| 10CC | 0823 | | SRA | R3,2 |
| 10CE | D820 1025 FFA5 | | MOVB | CURS,D16 |
| 10D4 | C803 8004 | | MOV | COLAD,R3 |
| 10D8 | C2A0 1006 | | MOV | R10,CURSDAL |
| 10DC | C220 1004 | | MOV | R8,ORIGDAL |
| 10E0 | C0A0 FF26 | | MOV | R2,CURSRO |
| 10E4 | 0822 | | SRA | R2,2 |
| 10E6 | C120 100C | | MOV | R4,D4 |
| 10EA | 0701 | | SETO | R1 |
| 10EC | C160 1034 | | MOV | R5,D2 |
| 10F0 | 2160 FF24 | | COC | R5,CURSCO |
| 10F4 | 1601 | | JNE | SVCURS |
| 10F6 | 0981 | | SRL | R1,8 |
| 10F8 | C160 100C | SVCURS | MOV | R5,D4 |
| 10FC | C802 8002 | SVCRSO | MOV | ROWAD,R2 |
| 1100 | C820 FFA8 8006 | | MOV | BANK,SHOBANK |
| 1106 | 0B0E | | NOP | |
| 1108 | C260 8000 | | MOV | R9,INDATA |

APPENDIX II-continued
MICROCODE FOR CRT OUTPUT ROM

| | | | | |
|---|---|---|---|---|
| 110C | CE09 | | MOV | (R8,I+),R9 |
| 110E | 1000 | | SZC | R9,R1 |
| | 0549 | | SOC | R9,R1 |
| 1112 | CE89 | | MOV | (R10,I+),R9 |
| 1114 | 0602 | | DEC | R2 |
| 1116 | 0605 | | DEC | R5 |
| 1118 | 16F1 | | JNE | SVCRSRO |
| 111A | A0A0 | | A | R2,D4 |
| | 100C | | | |
| 111E | 0583 | | INC | R3 |
| 1120 | C803 | | MOV | COLAD,R3 |
| | 8004 | | | |
| 1124 | 0701 | | SETO | R1 |
| 1126 | 0604 | | DEC | R4 |
| 1128 | 16E7 | | JNE | SVCURS |
| 112A | C820 | | MOV | CURSTIM,TCURS |
| | FFA2 | | | |
| | FF28 | | | |
| 1130 | 04C6 | | CLR | R6 |
| 1132 | 04E0 | NOACTION | CLR | TCOL |
| | FFA0 | | | |
| 1136 | C320 | | MOV | R12,IOAD |
| | 1036 | | | |
| 113A | C3E0 | | MOV | R15,MAXROCEL |
| | 1020 | | | |
| 113E | 1000 | | NOP | |
| 1140 | 1F0F | | TB | 15 |
| 1142 | 1601 | | JNE | *+2 |
| 1144 | 1025 | | JMP | ISCHAR |
| 1146 | C820 | | MOV | ROWAD,MAXROCEL |
| | 1020 | | | |
| | 8002 | | | |
| 114C | C360 | | MOV | R13,SHOBANK |
| | FFA8 | | | |
| 1150 | C820 | | MOV | COLAD,TCOL |
| | FFA0 | | | |
| | 8004 | | | |
| 1156 | 081D | | SRA | R13,1 |
| 1158 | 0A1D | | SLA | R13,1 |
| 115A | C80D | | MOVB | BANK,R13 |
| | 8006 | | | |
| 115E | 0B00 | | NOP | |
| 1160 | 8820 | | C | RECOGNIS,INDATA |
| | 8000 | | | |
| | 101C | | | |
| 1166 | 1302 | | JEQ | *+2 |
| 1168 | 0460 | | B | CAMERIN |
| | 1630 | | | |
| 116C | 0620 | | DEC | CURSTIM |
| | FF28 | | | |
| 1170 | 1502 | | JGT | *+2 |
| 1172 | 06A0 | | BAL | BLINKURSR |
| | 155E | | | |
| 1176 | 0460 | | B | NOACTION2 |
| | 1136 | | | |
| 117A | FFFF | CURSREST | EQU | |
| | FFFF | | | |
| | FFFF | | | |
| 1180 | C34B | | MOV | R13,R11 |
| 1182 | 9820 | | CB | CURS,D16 |
| | 1025 | | | |
| | FFA5 | | | |
| 1188 | 1302 | | JEQ | *+2 |
| 118A | 06A0 | | BAL | BLINKURSOR |
| | 155E | | | |
| 118E | 045D | | B | R13,1 |
| 1190 | 06A0 | ISCHAR | BAL | CURSREST |
| | 1180 | | | |
| 1194 | 1608 | | STCR | R8,L=8 |
| 1196 | 1E0F | | SBZ | 15 |
| 1198 | 9220 | | CB | R8,HOMCHR |
| | 1038 | | | |
| 119C | 1602 | | JNE | *+2 |
| 119E | 0460 | | B | HOME |
| | 1092 | | | |
| 11A2 | 9920 | | CB | R8,BANKAS |
| | 1039 | | | |
| 11A6 | 1602 | | JNE | *+2 |
| 11A8 | 0460 | | B | BANKSET |
| | 12A0 | | | |

APPENDIX II-continued

MICROCODE FOR CRT OUTPUT ROM

| | | | |
|---|---|---|---|
| 11AC | 9220 | CB | R8.CLR |
| | 1040 | | |
| 11B0 | 1602 | JNE | *+2 |
| 11B2 | 0460 | B | CLEARTN |
| | 1088 | | |
| 11B6 | 9220 | CB | R8.SCALE |
| | 1041 | | |
| 11BA | 1602 | JNE | *+2 |
| 11BC | 0460 | (B | STSCALE) |
| | 12BE | | |
| 11C0 | 9220 | CB | R8.SCANDN |
| | 1042 | | |
| 11C4 | 1602 | JNE | *+2 |
| 11C6 | 0460 | B | SCNDWN |
| | 12BE | | |
| 11CA | 9220 | CB | R8.SCANUP |
| | 1043 | | |
| 11CE | 0460 | B | SCNUP |
| | 12DC | | |
| 11D4 | 9220 | CB | R8.RLTBMRG |
| | 1044 | | |
| 11D8 | 1602 | JNE | *+2 |
| 11DA | 0460 | B | TBMRGNRELES |
| | 1062 | | |
| 11DE | 9220 | CB | R8.LFTREL |
| | 1046 | | |
| 11E2 | 1602 | JNE | *+2 |
| 11E4 | 0460 | B | RELLFT |
| | 12F0 | | |
| 11E8 | 9220 | CB | R8.RITREL |
| | 1047 | | |
| 11EC | 1602 | JNE | *+2 |
| 11EE | 0460 | B | RELRIT |
| | 1304 | | |
| 11F2 | 9220 | CB | R8.TABSET |
| | 1045 | | |
| 11F6 | 1602 | JNE | *+2 |
| 11F8 | 0460 | B | SETAB |
| | 1524 | | |
| 11FC | 9220 | CB | R8.SWITCH |
| | 1048 | | |
| 1200 | 1602 | JNE | *+2 |
| 1202 | 0460 | B | TIBUG |
| | 014E | | |
| 1206 | 9220 | CB | R8.CGEN |
| | 1049 | | |
| 120A | 1602 | JNE | *+2 |
| 120C | 0460 | B | CNTRUTINE |
| | 1350 | | |
| 1210 | 9220 | CB | R8.CAMCRET |
| | 104A | | |
| 1214 | 1602 | JNE | *+2 |
| 1216 | 0460 | B | RETCAM |
| | 1318 | | |
| 121A | 1000 | NOP | |
| | 1000 | | |
| 121E | 9220 | CB | R8.CRET |
| | 104B | | |
| 1222 | 1602 | JNE | *+2 |
| 1224 | 0460 | B | CARETN |
| | 109C | | |
| 1228 | 9220 | CB | R8.LNFED |
| | 104C | | |
| 122A | 1602 | JNE | *+2 |
| 122C | 0460 | B | LINEFEED |
| | 10A0 | | |
| 1232 | 9220 | CB | R8.DNCHR |
| | 104E | | |
| 1236 | 1602 | JNE | *+2 |
| 1238 | 0460 | B | DNMOV |
| | 15EE | | |
| 123C | 9220 | CB | R8.UPCHR |
| | 104F | | |
| 1240 | 1602 | JNE | *+2 |
| 1242 | 0460 | B | UPMOV |
| | 15D8 | | |
| 1246 | 9220 | CB | R8.LFTCHR |
| | 17FE | | |
| 124A | 1602 | JNE | *+2 |
| 124C | 0460 | B | LEFTGO |

APPENDIX II-continued

MICROCODE FOR CRT OUTPUT ROM

| | | | | |
|---|---|---|---|---|
| 1250 | 1600 9220 | | CB | R8,VIDCHR |
| 1254 | 103A 1602 | | JNE | *+2 |
| 1256 | 0460 1298 | | B | REVIDEO |
| 125A | C1E0 FF24 | | MOV | R7,CURSCO |
| 125E | A1E0 102A | | ADD | R7,D9 |
| 1262 | 81E0 FF4E | | C | R7,RITEMRGIN |
| 1266 | 1501 | | JLT | *+2 |
| 1268 | 1015 | | B | NEXTCH |
| 126A | 9220 17FF | | CB | R8,RITCHR |
| 126E | 1602 | | JNE | *+2 |
| 1270 | 0460 1610 | | B | RITEGO |
| 1274 | 9220 104D | | CB | R8,TAB |
| 1278 | 1602 | | JNE | *+2 |
| 127A | 0460 14E8 | | B | TABIT |
| 127E | 06A0 13C0 | | BAL | PCHAR |
| 1282 | 1000 1000 1000 | | | |
| 128A | 8820 FF24 100E | | C | CURSCO,COLOVR |
| 128E | 1102 | | JGT | NEXTCH |
| 1290 | 0460 109C | | B | CARETN |
| 1294 | 0460 10BC | NEXTCH | B | SAVECURS |
| 1298 | 0560 FF2A | REVIDEO | INV | STCH |
| 129C | 1009 | | JMP | NX1 |
| | FFFF | | | |
| 12A0 | 06A0 1070 | BANKSET | BAL | KYBDWT |
| 12A4 | 0B88 | | SRC | R8,8 |
| 12A6 | C808 FFA8 | | MOV | SHOBANK,R8 |
| 12AA | C820 FFA8 8006 | | MOV | BANK,SHOBANK |
| 12B0 | 0460 1294 | NX1 | B | NEXTCH |
| 12B4 | 26A0 1D70 | STSCALE | BAL | KYBDWT |
| 12B8 | D220 FFA6 | | MOVB | SCAIL,R8 |
| 12BC | 10F9 | | JMP | NX1 |
| 12BE | C0A0 FFAC | SCNDWN | MOV | R2,SCNHT |
| 12C0 | | | | |
| 12C2 | 60A0 FFAA | | S | R2,SCNINC |
| 12C6 | 1502 | | JGT | OKSCNDN |
| 12C8 | C0A0 1016 | | MOV | R2,D8 |
| 12CC | C802 FFAC | OKSNDN | MOV | SCNHT,R2 |
| 12D0 | C1E0 17FC | | MOV | R7,HEXD |
| 12D4 | 06A0 1B06 | | BAL | CNVTM |
| 12D8 | 10F1 | | JMP | NX1 |
| | FFFF | | | |
| 12DC | C0A0 FFAC | SCNUP | MOV | R2,SCNHT |
| 12E0 | A0A0 FFAA | | ADD | R2,SCANINC |
| 12E4 | 80A0 101A | | C | R2,MXSCAN |
| 12E8 | 15F1 | SCNON | JHT | OKSCNDN |
| 12EA | C0A0 101A | BGNSHSCN | MOV | R2,MXSCN |

APPENDIX II-continued

MICROCODE FOR CRT OUTPUT ROM

| | | | | |
|---|---|---|---|---|
| 12EE | 10EE | | JMP | OKSCNDN |
| 12F0 | C1A0<br>FF24 | RELLFT | MOV | R6,CURSCO |
| 12F4 | 81A0<br>FF2C | | C | R6,LFTMRGN |
| 12F8 | 1601 | | JNE | *+1 |
| 12FA | 04C6 | | CLR | R6 |
| 12FC | C806<br>FF2C | | MOV | LFTMRGN,R6 |
| 1300 | 0460<br>12B0 | NX2 | B | NX1 |
| 1304 | C1A0<br>FF24 | RELRIT | MOC | R6,CURSCO |
| 1308 | 81A0<br>FF4E | | C | R6,RITEMRGN |
| 130C | 1602 | | JNE | *+2 |
| 130E | C1A0<br>17FA | | MOV | R6,OVERCO |
| 1312 | C806<br>FF4E | | MOV | RITMRGIN,R6 |
| 1316 | 10F4 | | JMP | NX2 |
| 1318 | C820<br>FF2C | RETCAM | EQU | |
| 131C | FF24 | RTCAMI | MOV | CURSCO,LEFTMRGN |
| 131E | C820<br>FF24<br>8004 | | MOV | COLAD,CURSCO |
| 1324 | C220<br>FFAC | | MOV | R8,SCANHT |
| 1328 | 9820<br>1018<br>FFA6 | | CB | SCAIL,ASCI |
| 132E | 1306 | | JEQ | HTSCN |
| 1330 | 0810 | | SRA | R0,1 |
| 1332 | 9820<br>1019<br>FFA6 | | CB | SCAIL,ASC2 |
| 1338 | 1301 | | JEQ | HTSCN |
| 133A | 0810 | (NOP) | SRA | R0,1 |
| 133C | 0508 | HTSCN | NEG | R8 |
| 133E | A220<br>FF26 | | ADD | R8,CURSRO |
| 1342 | C808<br>FF26 | | MOV | CURSRO,R8 |
| 1346 | 0460<br>1626 | QUITC | B | |
| 134A | FFFF<br>FFFF<br>FFFF | | | |
| 1350 | 04E0<br>FF2A | CNTRUTIN | CLR | STCH |
| 1354 | 6820<br>1024<br>FF26 | ROLOOP | SUB | CURSRO,D16 |
| 135A | 04E0<br>FF24 | COLOOP | CLR | CURSCO |
| 135E | C220<br>FF2A | CHALOOP | MOV | R8,STCH |
| 1362 | 0B88 | | SRC | R8,8 |
| 1364 | 06A0<br>13C0 | | BAL | PCHAR |
| 1368 | 05A0<br>FF2A | | INC | STCH |
| 136C | 1F0F | | TB | 15 |
| 136E | 13EB | | JEQ | QUITC |
| 1370 | 8820<br>100E<br>FF24 | | C | CURSCO,COLOVR |
| 1376 | 15F3 | | JLT | CHALOOP |
| 1378 | 8820<br>102C<br>FF26 | | C | CURSRO,D32 |
| 137E | 11EA | | JLT | ROLOOP |
| 1380 | 10E2<br>10EB | | JMP | QUITC |
| 1384 | 04E0<br>FF9C | CLEAR | CLR | COL |
| 1388 | C820<br>FF9C<br>8004 | CLROW | MOV | COLAD,COL |

APPENDIX II-continued

MICROCODE FOR CRT OUTPUT ROM

| | | | | |
|---|---|---|---|---|
| 138E | 04E0 | | CLR | ROW |
| | FF9E | | | |
| 1392 | C820 | CLRLOOP | MOV | ROWAD,ROW |
| | FF9E | | | |
| | 8002 | | | |
| 1398 | 05A0 | | INC | ROW |
| | FF9E | | | |
| 139C | C820 | | MOV | WRIDATA,OLWD |
| | FF2A | | | |
| | 8000 | | | |
| 13A2 | 8820 | | C | ROW,CELOVRO |
| | 13B8 | | | |
| | FF9E | | | |
| 13A8 | 16F4 | | JNE | CLRLOOP |
| 13AA | 05A0 | | INC | COL |
| | FF9C | | | |
| 13AE | 8820 | | C | COL,CELOVCO |
| | 13BA | | | |
| | FF9C | | | |
| 13B4 | 16E9 | | JNE | CLROW |
| 13B6 | 045B | | B | R11,1 |
| 13B8 | 011D | CELOVRO | HEX | 11D |
| 13BA | 00D5 | CELOVCO | HEX | D5 |
| 13BC | FFFF | | | |
| | FFFF | | | |
| 13C0 | C820 | PCHAR | EQU | |
| | FF26 | | | |
| | FF9E | | | |
| 13C6 | 4220 | | SZC | R8,NDHIBITE |
| | 17F8 | | | |
| 13CA | C820 | | MOV | COL,CURSCO |
| | FF24 | | | |
| | FF9C | | | |
| 13D0 | 0848 | | SRA | R8,4 |
| 13D2 | A220 | | A | R8,CHAROFSET |
| | 17F6 | | | |
| 13D6 | C120 | | MOV | R4,=D9 |
| | 102A | | | |
| 13DA | C1B8 | MOVERT | MOV | R6,(R81+) |
| | 9820 | | | |
| | FF2A | | | |
| | 1034 | | | |
| 13E2 | 1601 | | CB | OLWD,HEXO |
| | 0546 | | | |
| | | | JEQ | *+1 |
| | | | INV | R6 |
| 13E6 | C020 | | MOV | R0,COL |
| | FF9C | | | |
| 13EA | 0240 | | ANDI | R0,0003 |
| | 0003 | | | |
| 13EE | 0A10 | | SLA | R0,1 |
| | 0460 | | | |
| | 1400 | | | |
| | FFFF | | | |
| | . | | | |
| | . | | | |
| | FFFF | | | |
| 1400 | C800 | | MOV | REMAINWD,R0 |
| | FF9A | | | |
| 1404 | 1000 | | NEG | R0 |
| 1406 | 1000 | | A | R0,D8 |
| 1408 | 1000 | | SLA | R0,1 |
| 140A | 0A10 | | SRC | R6 |
| | 0B06 | | | |
| 140E | C806 | | MOV | REMAN,R6 |
| | FF98 | | | |
| 1412 | C820 | | MOV | VTCNT,D4 |
| | 100C | | | |
| | FF92 | | | |
| 1418 | C2A0 | | MOV | R10,COL |
| | FF9C | | | |
| 141C | 082A | | SRA | R10,2 |
| 141E | C80A | | MOV | COLAD,R10 |
| | 8004 | | | |
| 1422 | C2A0 | | MOV | R10,NDLO12 |
| | 17F2 | | | |
| 1426 | C1E0 | | MOV | R7,REMAINWD |
| | FF9A | | | |
| 142A | 81E0 | | C | R7,D2 |

APPENDIX II-continued
MICROCODE FOR CRT OUTPUT ROM

|      |      |          |      |                |
|------|------|----------|------|----------------|
|      | 1034 |          |      |                |
| 142E | 1601 |          | JNE  | *+2            |
| 1430 | 0B4A |          | SRC  | R10,4          |
| 1432 | 81E0 |          | C    | R7,D4          |
|      | 100C |          |      |                |
| 1436 | 1601 |          | JNE  | *+1            |
| 1438 | 0B8A |          | SRC  | R10,8          |
| 143A | 81E0 |          | C    | R7,D6          |
|      | 17F0 |          |      |                |
| 143E | 1601 |          | JNE  | *+2            |
| 1440 | 0BCA |          | SRC  | R10,12         |
| 1442 | C80A | MASKSET  | MOV  | AND1,R10       |
|      | FF96 |          |      |                |
| 1446 | 054A |          | INV  | R10            |
| 1448 | C80A |          | MOV  | AND2,R10       |
|      | FF94 |          |      |                |
| 144C | C1E0 | ALLVT    | MOV  | R7,ROW         |
|      | FF9E |          |      |                |
| 1450 | 0827 |          | SRA  | R7,2           |
| 1452 | C807 | ALLVT2   | MOV  | ROWAD,R7       |
|      | 8002 |          |      |                |
|      | 1000 |          |      |                |
| 1458 | 1000 |          | NOP  |                |
| 145A | C820 |          | MOV  | BANK,SHOBANK   |
|      | FFA8 |          |      |                |
|      | 8006 |          |      |                |
| 1460 | 1000 |          | NOP  |                |
| 1462 | C160 |          | MOV  | R5,BUFDATA     |
|      | 8000 |          |      |                |
| 1466 | 4160 |          | AND  | R5,AND2        |
|      | FF94 |          |      |                |
| 146A | C1A0 |          | MOV  | R6,REMAN       |
|      | FF98 |          |      |                |
| 146E | C006 |          | MOV  | R0,R6          |
| 1470 | 41A0 |          | AND  | R6, AND1       |
|      | FF96 |          |      |                |
| 1474 | 0BC0 |          | SRC  | R0,12(=SLC4)   |
| 1476 | C800 |          | MOV  | REMAN,R0       |
|      | FF98 |          |      |                |
| 147A | E146 |          | IOR  | R5,R6          |
| 147C | C805 |          | MOV  | BUFDATA@1000,R5 |
|      | 8000 |          |      |                |
| 1480 | 0607 |          | DEC  | R7             |
|      | 1000 |          |      |                |
| 1484 | 0620 |          | DEC  | VTCNT          |
|      | FF92 |          |      |                |
| 1488 | 1302 |          | JEQ  | *+2            |
| 148A | 0460 |          | B    | ALLVT2         |
|      | 1452 |          |      |                |
|      | 1000 |          |      |                |
| 1490 | 2620 |          | CZC  | R8,HEXF        |
|      | 17EE |          |      |                |
| 1494 | 1601 |          | JNE  | *+2            |
| 1496 | 0648 |          | DECT | R8             |
| 1498 | 05A0 |          | INC  | COL            |
|      | FF9C |          |      |                |
| 149C | 1000 |          |      |                |
|      | 1000 |          |      |                |
|      | 1000 |          |      |                |
| 14A2 | 0604 |          | DEC  | R4             |
| 14A4 | 1302 |          | JEQ  | *+2            |
| 14A6 | 0460 |          | B    | MOVERT         |
|      | 13DA |          |      |                |
| 14AA | C820 |          | MOV  | CURSRO,ROW     |
|      | FF9E |          |      |                |
|      | FF26 |          |      |                |
| 14B0 | C820 |          | MOV  | CURSCO,COL     |
|      | FF9C |          |      |                |
|      | FF24 |          |      |                |
| 14B6 | 045B |          | B    | R11,IRETURN    |
|      | FFFF |          |      |                |
| 14BA | C820 | STCAMDET | MOV  | BANK,CAMBANK   |
|      | 100A |          |      |                |
|      | 8006 |          |      |                |
| 14C0 | C820 |          | MOV  | ROWAD,MAXROCEL |
|      | 1020 |          |      |                |
|      | 1002 |          |      |                |
| 14C6 | C160 |          | MOV  | R5,MAXCOLCEL   |
|      | 1022 |          |      |                |
| 14CA | 04C4 |          | CLR  | R4             |

APPENDIX II-continued

MICROCODE FOR CRT OUTPUT ROM

| | | | | |
|---|---|---|---|---|
| 14CC | C804 8004 | LOOPSET | MOV | COLAD,R4 |
| 14D0 | 1000 | | NOP | |
| 14D2 | C820 101C 8000 | | MOV | BUFDATA,RECOGNIS |
| 14D8 | 0584 | | INC | R4 |
| 14DA | 0605 | | DEC | R5 |
| 14DC | 16F7 | | JNE | LOOPSET |
| 14DE | C820 1030 8002 | | MOV | ROWAD,MEANROCEL |
| 14E4 | 0460 1DC8 | LOPSET2 | DEC | R4 |
| 14E8 | C160 1014 | TABIT | MOV | R5,MAXTB |
| 14EC | 0585 | | INC | R5 |
| 14EE | C120 1012 | | MOV | R4,DFTABL |
| 14F2 | C060 1026 | | MOV | R1,DFRITMRG |
| 14F6 | C0E0 101E | | MOV | R3,MAXROCR |
| 14FA | 0706 | FNDTAB | SETO | R6 |
| 14FC | 61A0 FF24 | | SUB | R6,CURSCO |
| 1500 | A194 | | ADD | R6,(R4,I) |
| 1502 | 150A | | JGT | MBTAB |
| 1504 | 05C4 | TABLUP | INCT | R4 |
| 1506 | 0605 | | DEC | R5 |
| 1508 | 15F8 | | JGT | FINDTAB |
| 150A | C211 | | MOV | R8,(R1,I) |
| 150C | 6220 FF24 | | SUB | R8,CURSCO |
| 1510 | A808 FF24 | | ADD | CURSCO,R8 |
| 1514 | 0460 1294 | | B | NEXTCH |
| 1518 | C086 | MBTAB | MOV | R2,R6 |
| 151A | 6183 | | SUB | R6,R3 |
| 151C | 1502 | | JGT | TABTOO |
| 151E | C0C2 | | MOV | R3,R2 |
| 1520 | C044 | | MOV | R1,R4 |
| 1522 | 10F0 | TABTOO | JMP | TABLUP |
| 1524 | C120 1012 | SETAB | MOV | R4,DFTABL |
| 1528 | C160 1014 | | MOV | R5,MXTAB |
| 152C | C060 FF24 | FNTABLP | MOV | R1,CURSCO |
| 1530 | 1312 | | JEQ | TABRET |
| 1532 | 6054 | | SUB | R1,(R4,I) |
| 1534 | 1312 | | JEQ | TABCLR |
| 1536 | 05C4 | | INCT | R4 |
| 1538 | 0605 | | DEC | R5 |
| 153A | 15F8 | | JGT | FNTABLP |
| 153C | 1000 | | NOP | |
| 153E | C160 1014 | | MOV | R5,MXTB |
| 1542 | C120 1012 | | MOV | R4,DFTABL |
| 1546 | C054 | TBSTLP | MOV | R1,(R4,I) |
| 1548 | 1304 | | JEQ | TABSET |
| 154A | 05C4 | | INCT | R4 |
| 154C | 0605 | | DEC | R5 |
| 154E | 15FB | | JGT | TBSTLP |
| 1550 | 1002 | | JMP | TABRET |
| 1552 | C520 FF24 | TABSET | MOV | (R4,I),CURSCO |
| 1556 | 0460 1294 | TABRET | B | NEXTCH |
| 155A | 04D4 | TABCLR | CLR | (R4,I) |
| 155C | 10FC | | JMP | TABRET |
| 155E | C820 FFA8 8006 | BLINKURSR | MOVB | BANK,SHOBANK |
| 1564 | C0A0 FF26 0822 | | MOV | R2,CURSRO |

APPENDIX II-continued
MICROCODE FOR CRT OUTPUT ROM

| | | | | |
|---|---|---|---|---|
| 156A | C802 8002 | | SRA | R2 |
| 156E | C0E0 FF24 | | MOV | R3,CURSCO |
| 1572 | 0823 | | ARS | R3 |
| 1574 | C803 8004 | | MOV | COLAD,R3 |
| 1578 | C220 1006 | | MOV | R8,CURSDAL |
| 157C | 9820 1025 FFA5 | | CB | CURS,D16 |
| 1582 | 1306 | | JEQ | CURSPIK |
| 1584 | D820 1025 FFA5 | | MOVB | CURS,D16 |
| 158A | C220 1004 | | MOV | R8,ORIGDAL |
| 158E | 1603 | | JMP | *+2 |
| 1590 | 782C FFA5 FFA5 | CURSPIK | SUBB | CURS,CURS |
| 1596 | C120 100C | | MOV | R4,D4 |
| 159A | C160 100C | CURSMOVO | MOV | R5,D4 |
| 159E | C802 8002 | CURSROMV | MOV | ROWAD,R2 |
| 15A2 | 1000 | | NOP | |
| 15A4 | C838 8000 | | MOV | OUTDATA,(R8,I+) |
| 15A8 | 0602 | | DEC | R2 |
| 15AA | 0605 | | DEC | R5 |
| 15AC | 16F8 | | JNE | CURSROMOV |
| 15AE | A0A0 100C | | A | R2,D4 |
| 15B2 | 0583 | | INC | R3 |
| 15B4 | C803 8004 | | MOV | COLAD,R3 |
| 15B8 | 0604 | | DEC | R4 |
| 15BA | 16EF | | JNE | CURSMOVO |
| 15BC | C820 FFA2 FF28 | | MOV | CURSTIM,TCURS |
| 15C2 | 05A0 FFA0 | | INC | TCOL |
| 15C6 | 8820 17EC FFA0 | | C | TCOL,D1 |
| 15CC | 1302 | | JEQ | *+2 |
| 15CE | 04E0 FFA0 | | CLR | TCOL |
| 15D2 | 045B FFFF FFFF | | B | R11 |
| 15D8 | C220 FF26 | UPMOV | MOV | R8,CURSRO |
| 15DC | A220 1024 | | ADD | R8,D16 |
| 15E0 | 8220 1028 | | C | R8,MAXRO |
| 15E4 | 1102 | | JLT | OMNRET |
| 15E6 | C808 FF26 | | MOV | CURSRO,R8 |
| 15EA | 0460 1626 | OMNRET | B | SHOCURO |
| 15EE | C220 FF26 | DNMOV | MOV | R8,CURSRO |
| 15F2 | 6220 102C | | SUB | R8,D32 |
| 15F6 | 11F9 | | JLT | OMNRET |
| 15F8 | 6820 1024 FF26 | | SUB | CURSRO,D16 |
| 15FE | 10F5 | OMRET | JMP | OMNRET |
| 1600 | C220 FF24 | LEFTGO | MOV | R8,CURSCO |
| 1604 | 6620 302A | | SUB | R8,D9 |
| 1608 | 11F0 | OMLFT | JLT | OMNRET |

APPENDIX II-continued

MICROCODE FOR CRT OUTPUT ROM

| | | | | |
|---|---|---|---|---|
| 160A | C808 | | MOV | CURSCO,R8 |
| | FF24 | | | |
| 160E | 10F7 | | JMP | OMRET |
| 1610 | C220 | RITEGO | MOV | R8,CURSCO |
| | FF24 | | | |
| 1614 | A220 | | ADD | R8,D18 |
| | 102E | | | |
| 1618 | 8220 | | C | R8,COLVR |
| | 100E | | | |
| 161C | 1501 | | JGT | *+2 |
| 161E | 10EF | | JMP | OMLFT |
| 1620 | A820 | | ADD | CURSCO,D9 |
| | 102A | | | |
| | FF24 | | | |
| 1626 | C0A0 | SHOCURO | MOV | R2,CURSRO |
| | FF26 | | | |
| 162A | 0460 | | B | SHORO |
| | 10B4 | | | |
| 162E | FFFF | | | |
| 1630 | 06A0 | CAMERIN | BAL | CURSREST |
| | 1180 | | | |
| 1634 | C160 | CAMERIN | EQU* | |
| | 17EA | | | |
| | | | MOV | R5,OVTIM |
| | | | INC | TCOL |
| 1638 | 8820 | | C | TCOL,MAXCOLCEL |
| | 1022 | | | |
| | FFA0 | | | |
| 163E | 1330 | | JH | MABEND |
| | 05A0 | | | |
| | FFA0 | | | |
| 1644 | C820 | CAMWAIT | MOV | COLAD,TCOL |
| | FFA0 | | | |
| | 8004 | | | |
| 164A | 0B00 | | NOP | |
| 164C | C80F | | MOV | ROWAD,R15 |
| | 8002 | | | |
| 1650 | 0B00 | | NOP | |
| 1652 | C80D | | MOVB | BANK |
| | 8006 | | | |
| 1656 | 0B00 | | NOP | |
| 1658 | C220 | | MOV | R8,INDATA |
| | 8000 | | | |
| 165C | 8220 | | C | R8,RECOGNIS |
| | 101C | | | |
| 1660 | 16E9 | | JNE | CAMARIN |
| 1662 | 0605 | | DEC | R5 |
| 1664 | 1BEE | | JH | CAMWAIT |
| 1666 | 0585 | | INC | R5 |
| 1668 | 0A25 | | SLA | R5,2 |
| 166A | 05A0 | | INC | TCOL |
| | FFA0 | | | |
| 166E | C820 | | MOV | COLAD,TCOL |
| | FFA0 | | | |
| | 8004 | | | |
| 1674 | 0B00 | | NOP | |
| 1676 | C80D | | MOV | BANK,CAMBANK |
| | 8006 | | | |
| | 0B00 | | | |
| 167C | 0B00 | | NOP | |
| 167E | C220 | | MOV | R8,INDATA |
| | 8000 | | | |
| 1682 | 8220 | | C | R8,RECOGNIS |
| | 801C | | | |
| 1686 | 16D6 | | JNE | CAMARIN |
| 1688 | A1A0 | PRNANWY | ADD | R6,TCOL |
| | FFA0 | | | |
| 168C | 0826 | | SRA | R6,2 |
| 168E | 0A26 | | SLA | R6,2 |
| 1690 | 04E0 | | CLR | TCOL |
| | FFA0 | | | |
| 1694 | C806 | | MOV | SCANLN,R6 |
| | FF90 | | | |
| 1698 | C820 | | MOV | HIRO,MAXROCEL |
| | 1020 | | | |
| | FF1E | | | |
| 169E | 100D | | JMP | ONETOONE |
| 16A0 | 81A0 | MABEND | C | R6,MAXCOLCEL |
| | 1022 | | | |
| 16A4 | 13F1 | | JEQ | PRNANWY |

APPENDIX II-continued
MICROCODE FOR CRT OUTPUT ROM

| | | | | |
|---|---|---|---|---|
| 16A6 | C3E0<br>1030<br>1000 | | MOV | R15,MEANROCEL |
| 16AC | 04E0<br>FFA0 | | CLR | TCOL |
| 16B0 | C1A0<br>1022 | | MOV | R6,MAXCOLCEL |
| 16B4 | 10C7<br>3020<br>FF1E | | JMP | CAMWAIT |
| 16BA | C820<br>FF26<br>FF12 | ONETOONE | MOV | SVCURSRO,CURSRO |
| 16C0 | C820<br>FF12<br>FF26 | HSWATH | MOV | CURSRO,SVCURSRO |
| 16C6 | A820<br>100C<br>FF24 | | ADD | CURSCO,D4 |
| 16CC | 8820<br>FF24<br>100E | | C | COLOVR,CURSCO |
| 16D2 | 1102 | | JLT | *+2 |
| 16D4 | 0460<br>1DB8 | | B | QUITSHO |
| 16D8 | 1000<br>1000 | | NOP | |
| 16DC | C120<br>FFAC | | MOV | R4,SCANHT |
| 16E0 | 1002<br>FFFF | | NOP | |
| 16E4 | FFFF | | NOP | |
| 16E6 | C804<br>FF1A | | MOV | REMHT,R4 |
| 16EA | C820<br>FF1E<br>FF18 | | MOV | HIRONOW,HIRO |
| 16F0 | C0E0<br>100C | VSWATH | MOV | R3,D4 |
| 16F4 | C120<br>FF1A | | MOV | R4,REMHT |
| 16F8 | 1602 | | JNE | *+2 |
| 16FA | 0460<br>1D80 | | B | |
| 16FE | 6120<br>100C | | SUB | R4,D4 |
| 1702 | 1101 | | JLT | *+2 |
| 1704 | 1003 | | JMP | SW1 |
| 1706 | C0E0<br>FF1A | | MOV | R3,REMHT |
| 170A | 04C4 | | CLR | R4 |
| 170C | C0A0<br>100C | SW1 | MOV | R2,D4 |
| 1710 | C804<br>FF1A | | MOV | REMHT,R4 |
| 1714 | C260<br>1004 | | MOV | R9,ORIGDAL |
| 1718 | C803<br>FF16 | SW2 | MOV | SWATHT,R3 |
| 171C | C820<br>FF18<br>FF14 | | MOV | CROW,HIRONOW |
| 1722 | C820<br>FFA0<br>8004 | | MOV | COLAD,TCOL |
| 1728 | C0E0<br>FF16 | | MOV | R3,SWATHT |
| 172C | C820<br>FF14<br>8002 | SWVRCL | MOV | ROWAD,CROW |
| 1732 | 0B00 | | NOP | |
| 1734 | C80D<br>100A<br>8000 | | MOV | BANK,R13 |
| 173A | 0B00 | | NOP | |
| 173C | CE60<br>8000 | | MOV | (R9I+),INDATA |
| 1740 | 0620<br>FF14 | | DEC | CROW |
| 1744 | 0603 | | DEC | R3 |

APPENDIX II-continued
MICROCODE FOR CRT OUTPUT ROM

| | | | | |
|---|---|---|---|---|
| 1746 | 16F2 | | JNE | SWVTCL |
| 1748 | C0E0<br>FF16 | | MOV | R3,SWATHT |
| 174C | 05A0<br>FFA0 | | INC | TCOL |
| 1750 | 0602 | | DEC | R2 |
| 1752 | 1302 | | JEQ | *+2 |
| 1754 | 0460<br>1718 | | B | SW2 |
| 1758 | 6820<br>100C<br>FF18 | | S | HIRONOW,D4 |
| 175E | C260<br>1004 | | MOV | R9,ORIGDAL |
| 1762 | 1000<br>1000 | | NOP | |
| 1766 | 9820<br>1018<br>FFA6 | | CB | SCAIL,ASC1 |
| 176C | 1602 | | JNE | *+2 |
| 176E | 0460<br>177E | | B | SWEAT |
| 1772 | 9820<br>1019<br>FFA6 | | CB | SCAIL,ASC2 |
| 1778 | 1602 | | JNE | *+2 |
| 177A | 0460<br>177E | | B | SWEAT |
| 177E | C2A0<br>1024 | SWEAT | MOV | R10,D16 |
| 1782 | 04C0 | | CLR | R0 |
| 1784 | C060 | SIXTN | SRC | R0,15 |
| 1786 | 1024 | | MOV | R1,D16 |
| 1788 | 04C7 | | CLR | R7 |
| 178A | C1B9 | | MOV | R6,(R9I+) |
| 178C | 1000 | | NOP | |
| 178E | 1305 | | JEQ | NOONES |
| 1790 | 0B16 | BITCNT | SRC | R6,1 |
| 1792 | 1501 | | JGT | NOTHISONE |
| 1794 | 0587 | | INC | R7 |
| 1796 | 0601<br>16FB | NOTHISON | DEC | R1 |
| 179A | 0BF0 | | JNE | BITCNT |
| 179C | 81E0<br>17E4 | NOONES | C | R7,MAXB |
| 17A0 | 1501 | | JLE | NOTONE |
| 17A2 | 0580 | SETONE | INC | R0 |
| 17A4 | 1000<br>1000 | NOTONE | NOP | |
| 17A8 | 060A | | DEC | R10 |
| 17AA | 16EC | | JNE | SIXTN |
| 17AC | 1000 | | | |
| 17AE | C820<br>FFA8<br>8006 | | MOV | BANK,SHOBANK |
| 17B4 | C060<br>FF26 | | MOV | R1,CURSRO |
| 17B8 | 0821 | | SRA | R1,2 |
| 17BA | C801<br>8002 | | MOV | ROWAD,R1 |
| 17BE | C060<br>FF24 | | MOV | R1,CURSCO |
| 17C2 | 0821 | | SRA | R1,2 |
| 17C4 | C801<br>8004 | | MOV | COLAD,R1 |
| 17C8 | 1000 | | NOP | |
| 17CA | C800<br>8000 | | MOV | DATOUT,R0 |
| 17CE | 6820<br>100C<br>FF26 | | SUB | CURSRO,D4 |
| 17D4 | 1000<br>1000 | | NOP | |
| 17D8 | 6820<br>100C<br>FFA0 | | SUB | TCOL,D4 |
| 17DE | 0460<br>16F0<br>FFFF | | B | VSWATH |
| 17E4 | 000C | MAXB | DEC | 14 |

APPENDIX II-continued
MICROCODE FOR CRT OUTPUT ROM

| | | | | |
|---|---|---|---|---|
| 17E6 | 00D5 | HXD5 | HEX | D5 |
| 17E8 | 0003 | D3 | DEC | 3 |
| 17EA | 1000 | OVTIM | DEC | 24K |
| 17EC | 0001 | D1 | DEC | 1 |
| 17EE | 000F | HEXF | HEX | 000F |
| 17F0 | 0006 | D6 | DEC | 6 |
| 17F2 | 0FFF | NDL012 | HEX | 0FFF |
| 17F4 | 0008 | D8 | DEC | 8 |
| 17F6 | 0800 | CHROFSET | HEX | 2800 |
| 17F8 | 80FF | NDHIBYTE | HEX | 80FF |
| 17FA | 0358 | OVERCO | DEC | 852 |
| 17FC | 000D | HEXD | DEC | 13 |
| 17FE | 0818 | LT/RTCHR | HEX | 0818 |
| 1D80 | 6820 | NOVSWATH | SUB | SCANLN,D4 |
| | 100C | | | |
| | FF90 | | | |
| 1D86 | 170E | | JNC | ENDREDU |
| 1D88 | A820 | | ADD | TCOL,D4 |
| | 100C | | | |
| | FFA0 | | | |
| 1D8E | 8820 | | C | TCOL,MAXCOLEL |
| | 100C | | | |
| | FFA0 | | | |
| 1D94 | 1605 | | JNE | NOCHNG |
| 1D96 | C820 | | MOV | HIRO,MEANROCEL |
| | 1030 | | | |
| | FF1E | | | |
| 1D9C | 04E0 | | CLR | TCOL |
| | FFA0 | | | |
| 1DA0 | 0460 | NOCHNG | B | HSWATH |
| | 16C0 | | | |
| 1DA4 | C820 | ENDREDU | MOV | ROW,SWCURSRO |
| | FF12 | | | |
| | FF26 | | | |
| 1DAA | 06A0 | | BAL | STCAMDET |
| | 14BA | | | |
| 1DAE | 0460 | | B | NEXTCH |
| | 1294 | | | |
| 1DB8 | 06A0 | QUITSHO | BAL | STCOMDET |
| | 14BA | | | |
| 1DBC | 0460 | | B | RTCAM1 |
| | 1318 | | | |
| 1DC8 | 0604 | | MOV | BUFDATA,RECOGNIS |
| | C820 | | | |
| | 101C | | | |
| | 8000 | | | |
| 1DD0 | 0585 | | INC | R5 |
| 1DD2 | C804 | | MOV | COLAD,R4 |
| | 8004 | | | |
| 1DD6 | 8160 | | C | R5,MAXCOLCEL |
| | 17E6 | | | |
| | 16F6 | | | |
| 1DDC | 045B | | JNE | LOPSET2 |
| 1DDE | FFFF | | B | R11,1 |
| 1DE0 | C820 | CARETN | MOV | CURSRO,LFTMRGIN |
| | FF2C | | | |
| | FF24 | | | |
| | 0460 | | | |
| | 10A0 | | | |
| | FF12 | SVCURSRO | BSS | 1 |
| | FF14 | CROW | | 1 |
| | FF16 | SWATHT | | 1 |
| | FF18 | HIRONOW | | 1 |
| | FF1A | REMHT | | 1 |
| | FF1C | SWATDIR | | 1 |
| | FF1E | HIRO | | 1 |
| | FF20 | THISCAN | | 1 |
| | FF22 | NEGIT | | 1 |
| | FF24 | CURSCO | | 1 |
| | FF26 | CURSRO | | 1 |
| | FF28 | CURSTIM | | 1 |
| | FF2A | STCH | | 1 |
| | FF2C | LFTMRGN | | 1 |
| | FF2E | ARATAB | | 16 |
| | . | | | |
| | . | | | |
| | . | | | |
| | FF4D | | | |
| | FF4E | RITMRGN | | 1 |

APPENDIX II-continued

MICROCODE FOR CRT OUTPUT ROM

| | | | |
|---|---|---|---|
| FF50 | CURSRCLS | | 16 |
| . | | | |
| . | | | |
| . | | | |
| FF6F | | | |
| FF70 | SAVORIG | | 16 |
| . | | | |
| . | | | |
| . | | | |
| FF8F | | | |
| FF90 | SCANLN | BSS | 1 |
| FF92 | VTCNT | | 1 |
| FF94 | AND2 | | 1 |
| FF96 | AND1 | | 1 |
| FF98 | REMAN | | 1 |
| FF9A | REMAINWD | | 1 |
| FF9C | COL | | CRT |
| FF9E | ROW | | CRT |
| FFA0 | TCOL | | 1 |
| FFA2 | TCURS | | 1 |
| FFA4 | CURS | | 0 |
| FFA6 | SCAIL | | 1 |
| FFA8 | SHOBANK | | 1 |
| FFAA | SCANINC | | 1 |
| FFAC | SCANHT | | 1 |
| FFAE | OLWD | | 1 |

APPENDIX III

MICROCODE FOR PRINTER OUTPUT

| | | | | | |
|---|---|---|---|---|---|
| 24C0 | FFFF,FFFF | | | | AC2 |
| 24C4 | 04C6 | POWAON | | CLR | R6 |
| C6 | C806,FEE0 | | | MOV | XAD,R6 set up |
| CA | C806,FEE2 | | | MOV | YAD,R6 home |
| CE | C820,27A2,FEE4 | | | MOV | SCANHT,MXSCAN |
| | | TBMRGNRELES | | MOV | RITMRGN,MAXX set rite margin at extreme |
| D4 | 1000,1000,10004C6 | | | CLR | R6 |
| DC | C806,FEEC | | | MOV | LFTMRGN,R6 |
| E0 | C160,27CC | | | MOV | R5,MAXTB the # of tabs allowed |
| E4 | C120,27AC,1000 | | | MOV | R4,DFTABL |
| EA | C506,1000 | TABZRO | | MOV | (R4,I),R6, clear tab table |
| EE | 05C4 | | | INCT | R4 |
| F0 | 0605 | | | DEC | R5 |
| F2 | 18FB,1000 | | | JOC | TABZRO |
| F6 | C820,2780,FF0E | | | MOV | RITMRGN,MAXX |
| FC | 0460,2350 | | | B | HOMOOV |
| 2000 | 06A0,2260 | READY | | EQU | * |
| | | | | BAL | XEND |
| 04 | C320,27A8 | KYBDWY | | MOV | R12,IOAD (old = 1FE0) |
| 08 | 1F0F | | | TB | 15 keyboard weight |
| 0A | 16FE | | | JNE | KYBDWT |
| 0C | 3606 | | | STCR | R6,L = 8 |
| 0E | 1E0F,1000 | | | SBZ | 15 reset data available |
| | | | | NOP | |
| 12 | 91A0,2796 | | | CB | R6,HOMCHR |
| 16 | 1602 | | | JNE | *+3 |
| 18 | 0460,2350 | | | B | HOMOOV |
| 1C | 91A0,2798 | | | CB | R6,UPCHR |
| 20 | 1602 | | | JNE | *+3 |
| 22 | 0460,236A | | | B | UPMOV |
| 26 | 91A0,279A | | | CB | R6,DNCHR |
| 2A | 1602 | | | JNE | *+3 |
| 2C | 0460,2376 | | | B | DNMOV |
| 30 | 91A0,27AE | | | CB | R6,RLTBMRG release tabs margins |
| 34 | 1602 | | | JNE | *+3 |
| 36 | 0460,24D4 | | | B | TBMRGNRELES |
| 3A | 91A0,27B0 | | | CB | R6,LFTREL set release left margin |
| 3E | 1602 | | | JNE | *+3 |
| 40 | 460,23FA | | | B | RELLFT |
| 44 | 91A0,27B2 | | | CB | R6,RITREL |
| 48 | 1602 | | | JNE | *+3 |
| 4A | 460,23E0 | | | B | RELRIT set release rite margin |

APPENDIX III -continued

| | | | | |
|---|---|---|---|---|
| 4E | 91A0,27B4 | | CB | CHARETN is it a carriage return |
| 52 | 1602 | | JNE | *+3 |
| 54 | 0460,251E,91A0, 27B6 | | B | CARETN yes |
| 5C | 1602,460,2532, 91A0,279C | | CB JNE | R6.LNFED *+3 |
| 66 | 1602,460,238C | | B | LNFEED |
| 06C | 1000,1000 | | CB JNE B | R6.LFTCHR *+2 LEFTGO |

R/W VARIABLES/CONSTANTS

| | | | | |
|---|---|---|---|---|
| D8 | | INCRE | BSS | 1 |
| DA | | SVCURSCO | BSS | 1 print scan only |
| FEDC | 200 | YTIME | DEC | time to wait between Y increments |
| FEDE | 70 | XTIME | DEC | time to wait between X increments |
| FEE0 | X | XAD | BSS | 1 |
| FEE2 | X | YAD | BSS | 1 |
| FEE4 | X | SCANHT | BSS | 1 |
| FDE6 | 400 | HTIME | HEX | 400 10 msec heat time |
| FDE8 | 1 | CLTIM | HEX | 1 cool time if needed |
| EA | 28 | SCANINC | DEC | 40 |
| FEEC | X | LFTMRGN | BSS | 1 |
| FFEE | X | ARATAB | BSS | 16 TAB array |
| FF0E | X | RITEMRGN | BSS | 1 must follow TAB array |
| FF10 | X | DIREC | BSS | 1 for printer swath direction |
| IFC | 460,F004 | | | |
| F700 | 200 | 1 PHDAD | 1EF6 for now | print head data address |
| F602 | 202 | E000 OFFSET | | chan ROM begins here? |
| F604 | 204 | 1FF2 HIAD | HEX | 1FF2 |
| F606 | 206 | 1FE0 IOADP | HEX | 1FE0 | only this page is needed to be entered
W = 380
R = F4C4
set printer at home
E for execute

| | | | | |
|---|---|---|---|---|
| FED6 D4 | | SVSCNLN | BSS | 1 |

ROM CONSTANTS

| | | | | |
|---|---|---|---|---|
| 2780 | 12C1 | MAXX | DEC | 4801 3 steps/5 mils |
| 82 | 899 | MAXY | DEC | 2201 |
| 84 | 1 | D1 | | |
| 86 | 5 | D5 | | |
| 88 | A | D10 | | |
| 8A | 10 | D16 | | |
| 8C | 8 | D8 | | |
| 8E | 0F00 | YDN | HEX | 0F00 |
| 90 | 0A00 | YUP | HEX | 0A00 |
| 92 | 0600 | XLFT | HEX | 0600 |
| 94 | 0200 | XRITE | HEX | 0200 |
| 96 | 0B0B | HOMCHR | HEX | 0B0B |
| 98 | 1A1A | UPCHR | HEX | 1A1A |
| 9A | 0A0A | DNCHR | HEX | 0A0A |
| 9C | 0808 | LFTCHR | HEX | 0808 |
| 9E | 1818 | RITCHR | HEX | 1818 |
| A0 | 4 | DSADX | HEX | 4 loest display X digit address |
| A2 | 200 | MXSCAN | DEC | 512 |
| A4 | 19 | YSTEP | DEC | 25 for 125 mils |
| A6 | 3C | XSTEP | DEC | 60 for 100 mill |
| A8 | 1FE0 | IOAD | HEX | 1FE0 for keyboard input |
| AA | 1FF2 | HIAD | HEX | 1FF2 |
| AC | FEEE | DFTABL | DEF | ARATAB |
| AE | 07FF | RLTBMRG | HEX | 07FF release tabs & margins |
| B0 | 0FFF | LFTREL | HEX | 0FFF set/release left margin |
| B2 | 02FF | RITREL | HEX | 02FF set/release right margin |
| B4 | 14FF | CHARETN | HEX | 14FF carriage return on keybd |
| B6 | 05FF | LNFED | HEX | 05FF line feed |
| B8 | 3C | D60 | DEC | 60 |
| BA | 9FF | TAB | HEX | 09FF keybd tab chan |
| BC | 209F | SPACE | HEX | 20FF |
| BE | 19 | D25 | DEC | 25 vt char ht in counts of 5 mils |

APPENDIX III -continued

| | | | | | |
|---|---|---|---|---|---|
| | C0 | 3 | D3 | DEC | 3 |
| | C2 | 4 | D4 | DEC | 4 |
| | C4 | 2 | D2 | DEC | 2 |
| | C6 | 1600 | SCANDN | HEX | 1600 char |
| | 27C8 | 1500 | SCANUP | HEX | 1500 char |
| | 27CA | 000D | HEXD | HEX | D |
| | 27CC | 0010 | MXTB | DEC | 16 max # of tabs |
| | 27CE | 40 | D64 | DEC | 64 |
| | 27D0 | 7 | D7 | DEC | 7 |
| | 27D2 | 000F | D15 | DEC | 15 |
| | 27D4 | 3C | D60 | DEC | 60 |
| | 27D6 | 19 | D27 | DEC | 25 |
| | 27D8 | 100 | TABSET | HEX | 100 |
| | 27DA | 600 | CAMCRET | HEX | 600 |
| | 27DC | E000 | OFSET | HEX | E000 Char ROM begin address |
| | 27DE | FF0E | DFRTMRGN | DEF | RITEMRGN |
| | 27E0 | 00E0 | YTIME | | |
| | E2 | 0048 | XTIME | | |
| | E4 | 0060 | HEATIME | | |
| | E6 | 0060 | COOLTIME | | |
| | E8 | 1EE0 | LOAD2 | HEX | 1EE0 |
| | 355E | C820,FFA8,1006 | BLINKURSR | MOVB | BANK,SHOBANK |
| | 64 | C0A0,FF26,0822 | | MOV | R2,CURSRO |
| | 6A | C802,1002,C0E0, | | SRA | R2 2 places |
| | | FF24 | | MOV | ROWAD,R2 unnecessary |
| | | | | MOV | R3,CURSCO |
| | 72 | 0823,C803,1004 | | ARS | R3, 2 places |
| | | | | MOV | COLAD,R3 |
| | 78 | C220,3006 | | MOV | R8,CURSDAL |
| | 7C | 9820,3025,FFA5 | | CB | CURS,D16 |
| | 82 | 1306 | | JEQ | CURSPIK |
| | 206C = | 1000,1000,91A0, | | CB | R6,TIBUGCHR |
| | | 27BD | | | |
| | 74 | 1602 | | JNE | |
| | 76 | 0460,3000 | | BLWP | CRT |
| | 7A | 91A0,27C6 | | CB | R6,SCANDN |
| | 7E | 1602 | | JNE | *+2 |
| | 80 | 460,23C6 | | B | SCNDOWN |
| | 84 | 91A0,27C8 | | CB | R6,SCANUP |
| | 88 | 1602 | | JNE | *+2 |
| | 8A | 460,23A0 | | B | SCNUP |
| | 8E | 91A0,27D8 | | CB | R6,TABSET |
| | 92 | 1602 | | JNE | *+2 |
| | 94 | 460,2420 | | B | SETAB |
| | 98 | 91A0,27DA | | CB | R6,CAMCRET |
| | 9C | 1602 | | JNE | *+2 |
| | 9E | 460,2548 | | B | RETCAM |
| | A2 | C120,FEE0 | | MOV | R4,XAD |
| | A6 | A120,27B8 | | ADD | R4,D60 the nbrofsteps/char |
| | AA | 6120,FF0E | | SUB | R,RITEMRGIN |
| | AE | 1102 | | JLT | *+2 |
| | B0 | 460,2000 | | B | READY don't do anything fo this as no room to print |
| | B4 | 91A0,279E | | CB | R6,RITCHR |
| | B8 | 1602 | | JNE | *+2 |
| | BA | 460,2380 | | B | RITEGO |
| | BE | 91A0,27BA | | CB | R6,TAB |
| | C2 | 1602 | | JNE | *+2 |
| | C4 | 460,2470 | | B | TABIT |
| | C8 | 460,2100 | | B | PCHAR |
| | CC | FFFF | | | |
| | | | POWRESET | BAL | SCNEND |
| (1A8) | 2350 | C220,FEE0 | HOMOOV | MOV | XAD to R8 |
| | 54 | 0508 | | NEG | R8 |
| | 56 | 06A0,2200 | | BAL | XMOV |
| | 5A | C220,FEE2 | | MOV | YAD to R8 |
| | 5E | 0508 | YUPMOV | NEG | R8 |
| (1B0) | 2360 | 6A0,2280 | YMOVTO | BAL | YMOV |
| | 64 | C0A0,FEE4 | | MOV | R2,SCANHT |
| | 68 | 1004 | | JMP | PAST |
| | 236A | C220,27A4 | UPMOV | MOV | YSTEP to R8 |
| | 6E | 460,235E | | B | YUPMOV |
| | | | PAST | B | INCSCN display scanht |
| | 72 | 0460,23B2 | | NOP | |
| | 2376 | C220,27A4 | DNMOOV | MOV | YSTEP to R8 |
| | 7A | 460,2360 | | B | YMOVTO |
| | 37E | FFFF | | | |
| (1C0) | 2380 | C220,27A6 | RITEGO | MOV | XSTEP to R8 |
| | 84 | 06A0,2200 | XGO | BAL | XMOV |
| | 88 | 0460,2000 | | B | READY |
| | 238C | C220,27A6 | LEFTGO | MOV | XSTEP to R8 |

-continued

APPENDIX III

| | | | | |
|---|---|---|---|---|
| 90 | 0508 | | NEG | R8 |
| 92 | 0460,2384 | | B | XGO |
| 396 | | | | |

*routine to move in the Y axis the number of
*steps in R8 on entry. + sign is down the pg
*
*no other registers have meaning on entry
*or exit

| | | | | |
|---|---|---|---|---|
| 2280 | 04CF | YMOV | CLR | R15 |
| 282 | 058F | | INC | R15 i.e. = D1 in R15 |
| 284 | 04C0 | | CLR | R0 showing that is 1st step |
| 286 | C120,278E | | MOV | YDN,R4 down is normal |
| 28A | C208 | | MOV | R8,R8 get sign of movement |
| 28C | 1329,1505 | | JE YEND | |
| | | | JGT | YSTPLP if normal, go ahead |
| 290 | C120,2790 | | MOV | YUP,R4 up movement needed |
| 294 | 050F | | NEG | R15 so decrease not increase |
| 296 | 0508,1000 | | NEG | R8 get abs value # of step |
| 29A | C320,27E8 | YSTPLP | MOV | R12,IOAD2 |
| 29E | C060,FEE2 | | MOV | R1,YAD |
| 2A2 | A04F | | ADD | R1,R15 |
| 2A4 | 111D | | JLT | YEND don't allow move beyond home |
| 2A6 | 8060,2782 | | C | R1,MAXY nor |
| 2AA | 131A,1000 | | JE | YEND beyond margin |
| 2AE | C801,FEE2 | | MOV | YAD,R1 |

*now for the actual movement

| | | | | |
|---|---|---|---|---|
| 2B2 | 3184 | | LDCR | R4,L = 4 set up direction and step bits |
| 2B4 | 1000,1000 | | MOV | HIAD,R12 |
| 2B8 | 1000,1000 | | LDCR | R4,L = 2 any reg would do |

*pulse the outputs, initiating the steps

| | | | | |
|---|---|---|---|---|
| 2BC | C160,27E0 | | MOV | R5,YTIME |
| 2C0 | 8220,27C4 | | C | R8,D2 is it the 2nd last step? |
| 2C4 | 1304 | | JEQ | DBLIT yes so wait longer after |
| 2C6 | C000 | | MOV | R0,R0 is it still zero? |
| 2C8 | 1602,1000 | | JNE | YTIMKIL |
| 2CC | 0A15 | DBLIT | SLA | R5,1 1 places so 2 times as long |

*after the 1st step & after the 2nd last step
*the wait before the next step is two times
*as long as normal
*

| | | | | |
|---|---|---|---|---|
| 22CE | 0605 | YTIMKIL | DEC | R5 count time down to zero |
| 2D0 | 15FE | | JGT | YTIMKIL |
| 2D2 | 0580 | | INC | R0 so it's not the first time |
| 2D4 | 0608 | | DEC | R8 count down the steps |
| 2D6 | 1204 | | JLE | YEND no more Y steps |
| 2D8 | 0460,229A,1000,1000 | | B | YSTPLP |

*here you have finished the movement so display

| | | | | |
|---|---|---|---|---|
| 22E0 | C1E0,278C | YEND | MOV | R7,D8 is Y display address |
| 2E4 | C060,FEE2 | | MOV | R1,YAD |
| 2E8 | C34B | | MOV | R11,R13 save return address |
| 2EA | 06A0,2300,1000,1000 | | BAL | CNVT 7 display 4 digits |
| 2F2 | 06A0,2330 | | BAL | DDIG & the hiest digit (5th) |
| 2F6 | 045D | | B | R13,I return |

*routine to move the printhead in the X axis alone the number of steps given in the Reg 8 & sign is to progress to the right. No other registers have meaning on entry or exit from this routine.

| | | | | |
|---|---|---|---|---|
| F200 | 04CF | XMOV | CLR | R15 |
| 202 | 058F | | INC | R15 positive increment |
| 204 | 04C0 | | CLR | R0 to show first step delay |
| 206 | C120,2794 | | MOV | R4,XRITE normal to rite |
| 20A | C208 | | MOV | R8,R8 get sign of movement |
| 20C | 1329,1505 | JEQ XEND | JGT | SXTPLP it is normal |

*here the movement is to be to the left not rite

| | | | | |
|---|---|---|---|---|
| 210 | C120,2792,1000 | | MOV | R4,XLFT NOP NOP |
| 216 | 050F | | NEG | R15 |
| 218 | 0508 | | NEG | R8 |
| 21A | C320,27E8 | XSTPLP | MOV | R12,IOAD2 |
| 21E | C060,FEE0 | | MOV | R1,XAD |
| 222 | A04F | | ADD | R1,R15 |
| 224 | 111B,1000 | | JLT | XEND don't go to left of left margin |

APPENDIX III

| | | | | |
|---|---|---|---|---|
| 228 | 8060,2780 | | C | R1,MAXX would this go to rite of margin |
| 22C | 1A19 | | JL | XEND it would be too far |
| 22E | C801,FEE0 | | MOV | XAD,R1 |
| 232 | 3184 | | LDCR | R4,L = 4 output direction bits |
| 234 | 1000,1000 | | MOV | R12,HIAD |
| 238 | 1000 | | LDCR | R4,L = 2 any reg would do |
| | | | MOV | R5,XTIME |
| 23A | C160,27E2,8220,27C4 | | C | R8,D2 is it 2nd last step? |
| 242 | 1303 | | JEQ | XDBLTM yes so longer delay |
| 244 | 8000 | | C | R0,R0 is it the first step |
| 246 | 1603,1000 | | JNE | XTIMKL |
| 24A | 0A25 | XDBLTM | SLA | R5,2 places (4 times longer wait) |
| 24C | 0605 | XTIMKL | DEC | R5 wait for the step |
| 24E | 15FE | | JGT | XTIMKL to settle |
| 250 | 0580 | | INC | R0 so it isn't 1st time |
| 252 | 0608,1000 | | DEC | R8 count down the steps |
| 256 | 1202 | | JLE | XEND |
| 258 | 0460,221A | | B | XSTPLP more steps needed |

*here the stepping necessary is complete so display

| | | | | |
|---|---|---|---|---|
| 25C | 045B,FFFF | | | |
| 260 | C0A0,FEE0 | XEND | MOV | R2,XAD |
| 264 | 04C1 | | CLR | R1 |
| 266 | 3C60,27C0 | | DIV | R1,D3 (3 steps for 5 mils) |
| 26A | C1E0,27C2 | | MOV | R7,D4 |
| 26E | C34B | | MOV | R13,R11 save return address |
| 270 | 06A0,2300 | | BAL | CNVT display 4 digit X address |
| 274 | 045D | | B | R13,1 return |
| 276 | | SCANUP EQU* | | |

*subroutine to increase the scan ht in steps of the scan ht increment

| | | | | |
|---|---|---|---|---|
| 3A0 | C060,FEE4 | | MOV | SCNHT,R2 |
| 3A4 | A0A0,26EA | | ADD | SCNINC,R2 |
| 3A8 | 80A0,27A2 | | C | R2,MXSCAN would that be too high? |
| 3AC | 1B02 | | JH? | INCSCN NOT too far |
| 3AE | C0A0,27A2 | SCNEND | MOV | MXSCAN,R2 yes too high |
| 3B2 | C802,FEE4 | INCSCN | MOV | R2,SCNHT |
| 3B6 | C1E0,27CA | | MOV | HEXD,R7 set for diplay |
| 3BA | C34B | | MOV | R11,R13 sae return address |
| 3BC | 6A0,2306 | | BAL | CNVTNM display 4 digits |

*of scan ht, the 4th is hidden
*by wraparound to non existent
*address

| | | | | |
|---|---|---|---|---|
| 3C0 | 4C6 | | CLR | R6 so return not confused |
| 3C2 | 460,2000 | | B | READY return to caller. |

.
.
.

*now rutine to decrease scan ht

| | | | | |
|---|---|---|---|---|
| 3C6 | C0A0,FEE4 | SCANDN | MOV | SCNHT to R2 |
| 3CA | 60A0,26EA | | S | SCNINC,R2 |
| 3CE | 1502 | | JGT | OKSCNDN |
| 3D0 | 4C2 | | CLR | R2 |
| 3D2 | 0582 | | INC | R2 set minimum ht |
| 3D4 | 460,23B2 | | OKSCNDN | |
| | | | B | INCSCN |
| 3D8 | FFFF,FFFF,FFFF,FFFF | | | |
| 3E0 | C1A0,FEE0 | RELRIT | MOV | R6,XAD |
| 3E4 | 8820,FF0E,FEE0 | | C | RITEMRGN,XAD |
| 3EA | 1602 | | JNE | *+2 |
| 3EC | C1A0,2780 | | MOV | R6,MAXX |
| 3F0 | C806,FF0E | | MOV | RITEMRGN,R6 |
| 3F4 | 460,2000 | | B | READY |
| 3F8 | FFFF | | | |
| 3FA | C1A0,FEE0 | RELLFT | MOV | R6,XAD |
| 3FE | 8820,FEEC,FEE0 | | C | LFTMRGN,XAD |
| 404 | 1601 | | JNE | *+2 |
| 406 | 4C6 | | CLR | R6 |
| 408 | C806,FEEC | MOV | R6,LFTMRGN | |
| 40C | 460,2000 | | B | READY |
| 410 | w'ld be next | | | |

*here you have a TAB request and it is still possible to move to the rite

| | | | | |
|---|---|---|---|---|
| 470 | C160,27CC | TABIT | MOV | R4,MXTB # of tabs poss |
| 74 | 9585 | | INC | R5 so rite margin stops it |

APPENDIX III

| | | | | |
|---|---|---|---|---|
| 76 | C120,27AC | | MOV | R4,DFTABL |

*now to find the tab setting closest to the rite of the current head position

| | | | | |
|---|---|---|---|---|
| 7A | C0E0,2780 | | MOV | R3,MAXX |
| 7E | 0A13,C060,27DE | | SLA | R3 1 place so even rite margin is to left |
| | | | MOV | R1,DFRTMRG so if at rite margin |
| 482 | | FNDTAB | SETO | R6 i.e. 1 this to require some notion to the rite |
| 84 | 0706 | | | |
| 86 | 61A0,FEE0 | | SUB | R6,XAD |
| 8A | A194 | | ADD | R6,(R4,I) |
| 8C | 150D | | JGT | MBTAB well it is to the rite |
| 8E | 1000 | TABLUP | NOP | |
| 90 | 05C4 | | INCT | R4 |
| 92 | 0605 | | DEC | R5 |
| (24A) 94 | 15FY | | JGT | FNDTAB loop till end or find |

*if it drops thru here then in R1 is tab array address needed

| | | | | |
|---|---|---|---|---|
| 96 | C211 | | MOV | R8,(R1,I) |
| 98 | 6220,FEE0 | | SUB | R8,XAD |
| 9C | 06A0,2200 | | BAL | XMOV go the tab |
| A0 | 460,2000 | | B | READY having tabbed what next |
| A4 | FFFF | | | |
| A6 | FFFF | | | |

*now this is to rite of the present loc but it may not be the closest to the rite

| | | | | |
|---|---|---|---|---|
| 4AB | C086 | MBTAB | MOV | R2,R6 save this distance |
| AA | 6183,1000 | | SUB | R6 R3 is it closer than the last? |
| A4 | 1502 | | JGT | TABTOO no it is not close |

*yes it was closer

| | | | | |
|---|---|---|---|---|
| B0 | C0C2 | | MOV | R3,R2 save the nu closer dist |
| B2 | C044 | | MOV | R1,R4 save the location in R1 |
| B4 | 0460,248E | TABTOO | B | TABLUP maybe another is closer |
| 4B8 | cont | | | |

*here yu are to set a tab

| | | | | |
|---|---|---|---|---|
| 420 | C120,27AC | SETAB | MOV | R4,DFTABL |
| 24 | C160,27CC | | MOV | R5,MXTB |
| 28 | 1000,1000,1000,1000 | | | |

*first, is any present tab already at this X address

| | | | | |
|---|---|---|---|---|
| 430 | C060,FEE0 | FNTABLP | MOV | R1,XAD |
| 434 | 1315 | | JEQ | TABRET no tab set at zero |
| 436 | 6054 | | SUB | R1,(R4,I) |
| 438 | 1316 | | JEQ | TABCLR is same so drop this tab |
| 43A | 05C4 | | INCT | R4 |
| 43C | 0605 | | DEC | R5 |
| 43E | 15F8 | | JGT | FNTABLP |
| 440 | 1000 | | NOP | |

*at end this means no tab = to current XAD
*so it is OK to add this one if space avail

| | | | | |
|---|---|---|---|---|
| 442 | C160,27CC | | MOV | R5 MXTB |
| 446 | C120,27AC | | MOV | R4,DFTABL |
| 44A | C054 | TBSTLP | MOV | R1,(R4,I) |
| 44C | 1307 | | JEQ | TABSET yes it is free |
| 44E | 05C4 | | INCT | R4 |
| 450 | 0605 | | DEC | R5 |
| 452 | 15FB | | JGT | TBSTLP |
| 454 | 1000 | | NOP | |

*if yu het here there was not room for this TAB to be inserted so yu shld complain

| | | | | |
|---|---|---|---|---|
| 456 | 0460,2000 | | B | READY or else ignore reque |
| 45A | FFFF | | | |
| 45C | C520,FEE0 | TABSET | MOV | (R4,I),XAD |
| 460 | 0460,2000 | TABRET | B | READY |
| 464 | FFFF | | | |
| 466 | 4D4 | TABCLR | CLR | (R4,I) |
| 468 | 0460,2000 | | B | READY |
| 46A | continue | | | |
| F510 | C220,27D4,1000 | SPACIT | MOV | R8. = D60 is 20 5 mil steps for char |
| 16 | 06A0,2200 | XMX | BAL | XMOV |
| 1A | 0460,2000 | | B | READY ( = OPERATOR) |

APPENDIX III -continued

| | | | | |
|---|---|---|---|---|
| 1E | C220,FEE0 | CRETN | MOV | R8,XAD |
| 22 | 6220,FEEC,1300 | | SUB | R8,LETMRGN |
| | | | JE | *+1 |
| | | CRETURN | NEG | R8 |
| 28 | 0508,06A0,2200 | | BAL | XMOV |
| 2E | 1000,1000 | | | |
| 32 | C220,27D6 | LNFEED | MOV | R8, = D25 (3 hits per spot *9 spots hi) |
| 36 | 06A0,2280 | | BAL | YMOV |
| 3A | 0460,2000 | | B | READY |
| 3E | 1000 | * | | |
| 40 | C220,FEE0, | ALLEFT | MOV (NEG R8) | R8,XAD |
| F544 | 460,2532 | B | CRETURN | |

PCHAR EQU*

*here to print an ordinary character

| | | | | |
|---|---|---|---|---|
| F100 | C120,2780 | | MOV | R4,MAXX |
| 104 | 6120,FEE0 | | SUB | R4,XAD |
| 108 | 1502 | | JGT | *+2 |
| 10A | 460,200 | | B | READY don't print if at margin |
| 10E | 0B86 | | SRC | R6,8 place input in rite bite |
| 110 | 0246,003F | | ANDI | R6,3F lo six bits only |
| 114 | 0A46 | | SLA | R6,4 make room for col # |
| 116 | 05C6 | | | |
| 118 | C2A0,27C2 | | MOV | R10 = D4 5 by 7 chars |
| 11C | A1A0,27DC | | ADD | R6,OFFSET |
| 120 | C256,1000 | COLOOP | INCT MOV | R6 this rom 1st col is nul R9,(R6,I) |
| 124 | C0A0,27CE | | MOV | R2 = D64 # of print head heaters |
| 128 | C320,2602 | | MOV | R12 PHDAD load of print head |
| 12C | 05C6 | | INCT | R6 adjust column may need to rotate R9 |
| 12E | C120,27D0 | BITLUP | MOV | R4,7 for ones |
| 132 | 2260,27EA | | COC | R9,H*4K is LSB of col one |
| 136 | 1301 | | JEQ | SENDA1 |
| 138 | 04C4,30C4 | | CLR | R4 zeros then |
| 13C | 30C4,30C4 | SENDA1 | LDCR | R4,L = 5 3 data bits start stop |
| 140 | 0A19 | | SLA | R9,1 notice arith shift |
| 142 | 06A0,27C0 | | SUB | R2,D3 |
| 146 | 15F3 | | JGT | BITLUP |

*now the print head shift reg is loaded so let's heat it up

| | | | | |
|---|---|---|---|---|
| 148 | C0E0,27C0 | | MOV | R3 = D3 3 col spots per dot |
| F14C | 06A0,216C | MOBURN | BAL | HEATONOFF |
| 150 | 06A0,2200 | | BAL | XMOV |
| 154 | 0603 | | DEC | R3 count down the 3 col spots per dot |
| 156 | 15FA | | JGT | MOBURN |
| 158 | 060A | | DEC | R10 the col # (5 cols) |
| 15A | 1102 | | JLT | NOLUP |
| 15C | 460,2120 | | B | COLOOP |
| 160 | C220,27D2 | NOLUP | MOV | R8, = 15 2 space cols 18 pulses but use 15 so = 100 mils |
| 164 | 460,2516 | | BAL | XMOV between chars |
| 168 | FFFF | | | |
| 16A | FFFF | | | |
| | | sub | | |
| 16C | C320,2600,1DFF | HEATONOFF | MOV SBO | R12,PHDAD 6 turn heat on |
| 172 | C160,27E4 | | MOV | R5,HTIME D400 1st time |
| 176 | 0605 | TIMEHT | DEC | R5 |
| 178 | 15FE,1000 | | JGT | TIMEHT |
| 17C | 1EFF | | SBZ | 6 turn heat off |
| 17E | C220,27C0 | | MOV | R8, = 3 set up for X move to follow |

*should yu wait for the heat to cool?

| | | | | |
|---|---|---|---|---|
| 182 | 1000 | | | |
| 184 | C160,27E6,1000 | | MOV | R5,CLTIM |
| 18A | 0605 | TIMECL | DEC | R5 |
| 18C | 15FE,1000 | | JGT | TIMECL |
| 190 | 45B,1000 | | B | R11, I return |
| 194 | | | | |
| 2004 | 0460,2610 | | B | PAWAIT |
| 2610 | 06A0,34BA | PAWAIT | BAL | STCAMDET |
| 2614 | C1A0,3020,04E0, | | MOV | R6,MAXROCEL |

-continued

APPENDIX III

| | | | | |
|---|---|---|---|---|
| | FFA0 | | | |
| 1C | 1000,1000,1000 | | CLR | TCOL |
| 22 | CC20,3036 | PAWAIT2 | MOV | R12,IOAD |
| 26 | 1F0F | | TB | 15 |
| 28 | 1602 | | JNE | *+2 |
| 2A | 0460,2008 | | B | PISCHAR |

*now no char was entered has anything been read by camera yet*

| | | | | |
|---|---|---|---|---|
| 2E | C820,3020,1002 | | MOV | ROWAD,MAXROCEL |
| 34 | 0B00,1000 | | TIME, | NOP |
| 38 | C820,FFA0,1004 | | MOV | COLAD,TCOL |
| 3E | 0B00,1000 | | TIME, | NOP |
| 42 | C360,3034 | | MOV | R13,CAMBANK |
| 46 | 081D | | SRA | R13,1 |
| 48 | 0A1D | | SLA | R13,1 |
| | address | | | |
| 4A | C80D,1006 | | MOV | RANK,R13 |
| | | | TIME, | NOP |
| 4E | 0B00,1000,8820,1000,301c | | C | RECOGNIS,INDATA |
| 58 | 1302 | | JEQ | *+2 |
| 5A | 0460,2670 | | B | PCAMERIN |
| 5E | 1000,1000 | | NOP, | NOP |
| 62 | 0460,2622 | | JMP | PAWAIT2 |
| 66 | next FFFF,FFFF,FFFF,FFFF,FFFF | | | |

*here camera movement was detected*

| | | | | |
|---|---|---|---|---|
| 2670 | C160,37EA | PCAMERIN | MOV | R5,OVTIM |
| 74 | 8820,3022,FFA0 | | C | TCOL,MAXCOLCEL |
| 7A | 1602,0460,26F6 | | JE | PMABEND at end |
| 80 | 05A0,FFA0 | | INC | TCOL |
| 84 | C806,1002,0B00, 1000nop | PCAMWAIT | MOV | ROWAD,R6 |
| | | | TIME, | NOP |
| | | | MOV | COLAD,TCOL |
| 8C | C820,FFA0,1004, 0B00,1000 | | TIME, | NOP |
| 96 | C80D,1006 | | MOV | BANK,R13 |
| 9A | 0B00,1000 | | TIME | NOP |
| 9E | C220,1000address | | MOV | R8,INDATA |
| A2 | 8220,301C | | C | R8,RECOGNIS |
| A6 | 16E4 | | JNE | PCAMERIN |
| A8 | 0605 | | DEC | R5 |
| | nop | | | |
| AA | 1BEC,1000,1000 | | J11 | PCAMWAIT |

*now if camera reads data which is accidentally = recognis yu will time out also*

| | | | | |
|---|---|---|---|---|
| B0 | 05A0,FFA0 | | INC | TCOL |
| B4 | C820,FFA0,1004 | | MOV | COLAD,TCOL |
| BA | 0800,1000 | | TIME, | NOP |
| BE | C220,1000address | | MOV | R8,INDATA |
| C2 | 8220,301C | | C | R8,RECOGNIS |
| C6 | 16D4 | | JNE | PCAMERIN |
| C8 | C1E0,FFA0 | PPRINANYWAY | MOV | R7,TCOL is ¼ bitcut |
| CC | 81A0,3020,1302, A1E0,3022 | | C | R6,MAXROCEL |
| | | | JEQ | *+2 |
| | | | ADD | R7,MAXCOLCEL |
| D6 | 1000,1000,1000 | | SRA | R7,2 ?? not for one to one |
| 26DC | 1000 | | SLA | R7,2 ?? |
| 26DE | 04E0,FFA0 | | CLR | TCOL |
| 6E2 | C807,FF90 | | MOV | SCANLN,R7 |

*here yu are to print the camera input*

| | | | | |
|---|---|---|---|---|
| 0810 | 04E0,FF10 | PONETOONE? | CLR | DIREC initiative to rite |
| 14 | 04E0,FFA0,C820, FEE2,FF12 | | CLR | TCOL assume camera scan |
| | | | MOV | SVCURSRO,YAD |
| 1E | C820,3020,FF1E | | MOV | HIRO,MAXROCEL |
| 24 | C820,FEE0,FEDA | | MOV | SVCURSCO,XAD |
| 2A | C820,37EC,FED8 | | MOV | INCRE,D1 |
| 30 | C820,FF90,FED6 | | MOV | SVSCNLN,SCANLN |
| 36 | C820,FEE4,FF1A, 1000,1000,1000, 1000,1000 | | MOV | REMHT,SCANHT |
| 46 | 1002,FFFF,FFFF | PHSWATH | MOV | SVCURSCO,SVCURSCO? |
| 4C | C820,FED6,FF90 | | MOV | SCANLN,SVSCNLN |
| 52 | C120,FF1A | PVSWATH | MOV | R4,REMHT?? |
| 56 | 1000,1000,1000, 1000,1000,1000 | | NOP NOP NOP NOP NOP | |
| 62 | C0E0,37F4 | PSW3 | MOV | R3,D8 (32 bit head) |
| 66 | C120,FF1A | | MOV | R4,REMHT |
| 6A | 1602 | | JNE | *+2 |
| 6C | 0460,386A | PNOVSWATH | B | PNOVSWATH shld never read here |
| 70 | 6120,37F4 | | SUB | R4,D8 32 bit head normal swath ht |

APPENDIX III

| | | | | |
|---|---|---|---|---|
| 74 | 1101 | | JLT | PSW0 |
| 76 | 1005 | | JMP | PSW1 |
| 78 | C0E0,FF1A | PSW0 | MOV | R3,REMHT |
| | nops | | | |
| 7C | 04C4,1000,1000 | | CLR | R4 |
| 82 | C0A0,300C | PSW1 | MOV | R2,D4 (4 cols in cel) |
| 86 | 1001,FFFF | | | |
| | nop | | | |
| 8A | C260,3000,1000 | | MOV | R9,CURSDAL |
| | nop nop | | | |
| | 1000,1000 | | | |
| 94 | C803,FF16 | PSW2 | MOV | SWATHT,R3 |
| 98 | C820,FF1E,FF14, | | MOV | CROW,HIRO |
| | nop nop | | | |
| | 1000,1000,1000 | | | |
| A4 | C820,FFA0,1004 | PSWVTCL | MOV | COLAD,TCOL |
| AA | 0B00 | | TIME | |
| AC | C820,FF14,1002 | | MOV | ROWAD,CROW |
| B2 | 0B00 | | TIME | |
| B4 | C820,FFA8,1006 | | MOV | BANK,CAMBANK |
| BA | next | | | |
| BA | 0B00 | | TIME | |
| | address | | | |
| BC | CE60,1000 | | MOV | R9+,INDATA |
| C0 | 0620,FF14 | | DEC | CROW |
| C4 | 0603 | | DEC | R3 |
| C6 | 16EE | | JNE | PSWVTCL swatch vert col |
| C8 | 1000,1000,1000 | | | |

*now yu have 4 vt cols that can be printed

| | | | | |
|---|---|---|---|---|
| CE | C260,3006 | | MOV | R9,CURSDAL |
| D2 | C060,3024 | PTOLEFT | MOV | R1,D16 (64 shift reg stage |
| D6 | C0E0,37F4 | | MOV | R3,D8 (D16 for 64) |
| DA | C020,08FC | | MOV | R0,D12 for SRC |
| DE | C182 | | MOV | R6,R2 |
| E0 | 9820,FF10,300C | PLFRT | CB | DIREC,D4 (hi byte is 0) |
| E6 | 1603 | | JNE | *+2 |
| E8 | 0506,A1A0,2786 | | NEG | R6 |
| | | | ADD | R6,D5 |

*here yu are to print to left

| | | | | |
|---|---|---|---|---|
| EE | 1004,FFFF, | | NOP,NOP | |
| F2 | FF,FF,FFFF | | NOP,NOP | room for fixes |
| | | | NOP,NOP | |
| | nop | | | |
| F8 | C219,1000 | | MOV | R8,(R9I) |
| FC | 0548 | | INV | R8 so print black on white |
| FE | 81A0,37EC | | C | R2,D1 1st of 4 |
| 902 | 130B | | JEQ | PRITMOS |
| 904 | 0B08 | | SRC | R8,0 reg 0 has 4 or C |
| 906 | 81A0,3034 | | C | R2,D2 |
| 90A | 1306 | | JEQ | PRITMOS |
| 0C | 0B08 | | SRC | R8,0 |
| 0E | 81A0,37E8 | | C | R6,D3 |
| 12 | 1301 | | JEQ | PRITMOS |
| 14 | 0B08 | | SRC | R8,0 |
| 16 | 31C8,0B18,31C8, | PRITMOS | LDCR | R8,L = 4 |
| | 0B18,30C8 | | | |
| 20 | 0B18,30C8 | | DEC | R1 (# of shift reg cycles |
| 24 | 0601 | | | |
| 26 | 0603 | | DEC | R3 |
| 28 | 16E6 | | JNE | PTOLEFT?? |

*now to fill up rest of shift reg to get data to hi end

| | | | | |
|---|---|---|---|---|
| 92A | 0A21 | | SLA | R1,2 |
| 92C | 0601 | PFLUSH | DEC | R1 |
| 2E | 1106 | | JLT | PENCOLSWAT |
| 30 | 04C8 | | CLR | R8 |
| 32 | 30C8 | | LDCR | R8,3 |
| 34 | 10FB | | JMP | PFLUSH |
| 36 | FF,FF,FF | | | |
| 3C | 06A0,216C | PENCOLSWAT | BAL | HEATONOFF print |
| 40 | 1000 nop | | | |
| 42 | 9820,300C,FF10 | | CB | DIREC,D4 to rite is 0 |
| 48 | 1302 | | JEQ | PRT1 |
| 4A | 0508 | | NEG | R8 (set by Heatonoff at 3 |
| 4C | 1003 | | JMP | PRT2 |
| 4E | 8820,2780,FEE0 | PRT1 | C | XAD,MAXX |
| | | | JNE | *+2 |
| | | | B | RTREV |
| 54 | 1339,06A0,2200, | PRT2 | BAL | XMOV |
| | 05C9,0602,16B9 | | INCT | R9 |
| 60 | 1000 | | DEC | R2 |

APPENDIX III -continued

| | | | | |
|---|---|---|---|---|
| 62 | A820,FED8,FFA0 | | JNE | PTOLEFT |
| | | | ADD | TCOL,INCRE |
| 68 | 1101 | | JLT | PRT4 |
| 6A | 1011 | | JMP | PRT5 |
| 6C | 1000 nop | | | |

*yu are at left of screen but maybe not left of scan

| | | | | |
|---|---|---|---|---|
| 6E | 8820,3030,FF14 | PRT4 | C | CROW,MEANROCEL |
| 74 | 1532,1001,FFFF | | JGT | LFTREV |
| 7A | C820,3022,FFA0, A820,0FFE,FF1E, * | | MOV | TCOL,MAXCOLCEL yu just completed left going swath |
| | 0460,09BC,FFFF | | ADD | HIRO,BLKDIF |
| | | | JMP | PMVX |
| 8C | 0620,FF90 | PRT5 | DEC | SCANLN |
| 90 | 1320,1000 | | JEQ | PREVERS |
| 94 | 9820,FF10,300C | | CB | DIREC,D4 is it 0 for rite |
| 9A | 1610,1000 nop | | JNE | PMVX? |
| 9E | 9820,3030,FF14 | | C | CROW,MEANROCEL |
| A4 | 1502 | | JGT | PRT3 |
| A6 | 100A,1000 nop | | JMP | PMVX |
| AA | 8820,37E6,FFA0 | PRT3 | C | TCOL,HEXD5 |
| B0 | 1605 | | JNE | PMVX |

*so go to left of lower camera section but on same swath

| | | | | |
|---|---|---|---|---|
| 9B2 | 04E0,FFA0 (0) | | CLR | TCOL |
| B6 | 6820,3FFE,FF1E | | SUB | HIRO,BLDKIF (is dif tween) MAXROCEL & MEANROCEL) |
| BC | 1001,FFFF | PMVX | NOP | NOP in R8 is amt + direc ±3 |
| C0 | 0460,0862,FFFF, FFFF | | B | PSW3 |
| C8 | D820,300D,FF10 | RTREV | MOVB | DIREC,(D4 + 1) set for lefto |
| CE | 1008,FFFF | | JMP | DIRC |
| D2 | PREVERS 9820,3- 00C,FF10 | CB | DIREC,D4 | |
| D8 | 13F7 | | JEQ | RTREV just completed going rite |
| DA | 1000 | LFTREV | NOP | |
| DC | 04E0,FF10 | | CLR | DIREC |
| E0 | 0520,FED8 | DIRC | NEG | INCRE |
| E4 | C220,FF16 | | MOV | R8,SWATHT (43 is closest is approx the ht of 32 heads shld be 32 if rite size & full ht) |
| E8 | nops 1000,0A28 | | SLA | R8,2 |
| EC | 06A0,2280 | | BAL | YMOV |
| F0 | 6820,FF16,FF1E | | SUB | HIRO,SWATHT |
| F6 | A820,FED6,FFAO | | ADD | TCOL,INCRE correct for overshoot |
| FC | 6820,FF16,FF1A | | SUB | REMHT,SWATHT is it end of print |
| A02 | 1302 | | JEQ | *+2 yest |
| 04 | 0460, | | B | PHSWATH go print next swath |
| A08 | nop C220,FF12,1000 | | MOV | R8,SVCURSRO |
| A0E | 6220,FEE2 | | SUB | R8,YAD |
| A12 | 06A0,2280 | | Bal | YMOV leave print head at top |
| A16 | 1000 | | NOP | |

*this is end of print the scan
*but yu may be at wrong end of scan

| | | | | |
|---|---|---|---|---|
| A18 | 9820,2000,FF10 | | CB | DIREC,D4 |
| 1E | 1306 | | JEQ | ENDPRINT |
| 20 | C220,FED6 | | MOV | R8,SVSCANLN |
| 24 | 0A28,1000 nop | | SLA | R8,2 |
| 28 | 06A0,2200 | | BAL | XMOV mov to rite side if on left |
| 2C | 0460,2000 | ENDPRINT | B | NEXTCH |
| A30 | next & OFFEE = 0096 OFFC = 000C | BLKDIF D12 | MEANROCEL + this = MAXROCEL | |
| 26E6 | C820,3020,FF1E | | MOV | HIRO,MAXROCEL |
| EC | 0460,0810 | | B | P ONETOONE |
| F0 | 1000,1000,1000 | | | |
| F6 | 81A0,3030 | PMABEND | C | R6,MEANROCEL |
| FA | 13E6 | | JEQ | PPRINANYWAY |
| FC | C1A0,3030 | | MOV | R6,MEANROCEL |

-continued

APPENDIX III

| 2700 | 04E0,FFA0 | CLR | TCOL |
| 2704 | 0460,2684 | B | PCAMWAIT |
| 2708 | next | | |

What is claimed is:

1. A selective image copier comprising:
   a scanner, manually operable by a user thereof, including manually-activated means for serially scanning a portion of said image, whereby electrical signals are produced corresponding in intensity to the portion of the image scanned;
   means responsive to said scanner for digitizing said electrical signals to thereby produce first-digital signals;
   means for sensing movement of said scanner, said movement being by a scan increment which places said scanning means at a different location on said image;
   a printing medium;
   a print head comprising a plurality of print elements arranged in a print column;
   means responsive to said first-digital signals from said digitizing means for applying second-digital signals corresponding to said first-digital signals in parallel simultaneously to said print elements to thereby print an image on said printing medium in response to said second signals;
   motion-control means for imparting relative motion between said print head and said printing medium in a direction which is orthogonal to said print column, said movement being by a print increment which bears a predetermined relationship to said scan increment; and
   means connected to said motion-control means, responsive to said scanner-movement-sensing means, for synchronizing the relative movement of said print head and printing medium with the movement of said scanner.

2. The combination in accordance with claim 1 wherein said digitizing means further comprises a data buffer for storing digital signals, and means for modifying digital signals stored in said data buffer.

3. The combination in accordance with claim 2 wherein said manually-operable scanner further includes indicator means for indicating at said scanner that said data buffer is unable to store data, whereby overrun of said buffer is prevented by said user deactivating said serial-scanning means.

4. The combination in accordance with claim 2 wherein said means for modifying includes a microprocessor and keyboard input means to said microprocessor whereby said print head is controlled by said keyboard so that information in addition to said scanned image is printed on said print medium.

5. The combination in accordance with claim 1 further comprising:
   means for imparting relative motion between said print head and said print medium in such a direction and by such an amount as to effectuate line indexing of the printed image on said print medium.

6. In a selective copying system wherein selected portions of a source document image are copied by a user onto a copy paper, the improvement comprising:
   a manually-operated, portable scanner adapted to scan a selected portion of said document by a user placing said scanner at any selected line position on said source document, said scanner adapted to be used to scan said document in a user-selected sequence;
   printing means including a pring head responsive to said scanner for copying said scanned image onto said copy paper; and
   means for positioning said print head anywhere on said copy paper in a user-selected sequence;
   whereby the portion of the image selected by said user on said source document is reproducible at any position on said copy paper, said position being separately selected by said user.

7. The combination in accordance with claim 6 wherein said scanner further comprises:
   first means for converting signals corresponding to a scanned image into digital first-print data; and
   wherein said printing control means further comprises:
   second means for inputting additional digital second-print data;
   means responsive to said first-and-second means for transmitting said first- and second-print data to said print head; and
   means at said print head responsive to said print data for printing said scanned image and said additional print data onto said copy paper.

8. The combination in accordance with claim 6 wherein said scanner includes variable field selection means for changing the amount of the source document scanned and said printing means includes means for advancing the reproduced image by an amount determined by the setting of said variable field selection means.

9. A selective-image recorder comprising:
   a scanner including means for serially scanning a portion of said image, whereby a series of electrical signals are produced corresponding in intensity to the portion of the image scanned;
   means responsive to said scanner for digitizing said series of electrical signals to thereby produce a series of first-digital signals;
   a buffer for storing said first-digital signals;
   means for sensing movement of said scanner, said movement being by a scan increment which places said scanning means at a different location on said image;
   a recording medium;
   a recording head comprising recording means for recording digital data on said recording medium;
   means responsive to said buffer for applying second-digital signals corresponding to said first-digital signals to said recording head to thereby record data on said recording mediumin response to said second signals; and
   motion-control means for imparting relative motion between said recording medium and said recording head, said movement being by an increment which bears a predetermined relationship to said scan increment;

whereby variable length selectively-scanned material is recorded on said recording medium as a series of adjacent digital data records.

10. The combination in accordance with claim 9 wherein said recording head is a thermal print head and said recording medium is heat-sensitive paper.

11. The combination in accordance with claim 9 wherein said recording head is a magnetic tape head and said recording medium is magnetic recording tape.

12. The combination in accordance with claim 9 further comprising means for modifying digital signals stored in said data buffer.

13. The combination in accordance with claim 9 wherein said scanner further includes indicator means for indicating at said scanner that said data buffer is unable to store data, whereby overrun of said buffer is prevented by said user deactivating said serial scanning means.

14. The combination in accordance with claim 12 wherein said recording head is a print head, said recording medium is a print medium, and said means for modifying includes a microprocessor whereby said print head is controlled by said keyboard so that information in addition to said scanned image is printed on said print medium.

15. The combination in accordance with claim 10 further comprising:
means for imparting relative motion between said print head and said heat-sensitive paper in such a direction and by such an amount as to effectuate line indexing of the printed image on said paper.

16. The combination in accordance with claim 12 wherein said means for modifying includes a microprocessor and keyboard input means to said microprocessor whereby said motion control means is controlled by said keyboard so that information in addition to said scanned image is recorded on said recording medium.

17. The combination in accordance with claim 9 wherein said recording medium is the screen of a cathode ray tube and said recording means is an electron beam.

18. The combination in accordance with claim 16 wherein said recording medium is the screen of a cathode ray tube and said recording means is an electron beam.

* * * * *